(12) United States Patent
Kwa et al.

(10) Patent No.: US 9,030,481 B2
(45) Date of Patent: May 12, 2015

(54) METHOD AND APPARATUS FOR REDUCING POWER USAGE DURING VIDEO PRESENTATION ON A DISPLAY

(71) Applicant: Intel Corporation, Santa Clara, CA (US)

(72) Inventors: Seh Kwa, Saratoga, CA (US); Satyanarayana Avadhanam, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 279 days.

(21) Appl. No.: 13/631,681

(22) Filed: Sep. 28, 2012

(65) Prior Publication Data

US 2014/0002739 A1    Jan. 2, 2014

Related U.S. Application Data

(63) Continuation-in-part of application No. 13/536,221, filed on Jun. 28, 2012.

(51) Int. Cl.
G09G 5/36 (2006.01)
G09G 5/39 (2006.01)
H04N 5/46 (2006.01)
H04N 5/04 (2006.01)
G06F 3/14 (2006.01)
H04N 21/4402 (2011.01)

(52) U.S. Cl.
CPC . *H04N 5/46* (2013.01); *H04N 5/04* (2013.01); *G06F 3/14* (2013.01); *H04N 21/440281* (2013.01)

(58) Field of Classification Search
None
See application file for complete search history.

(56) References Cited

U.S. PATENT DOCUMENTS

2013/0021352 A1*  1/2013  Wyatt et al. .................. 345/520

* cited by examiner

*Primary Examiner* — Jacinta M Crawford
(74) *Attorney, Agent, or Firm* — Kacvinsky Daisak Bluni PLLC

(57) ABSTRACT

An apparatus may include a link component and a display component. The link component may be operative to receive media content via data frames over a display interconnect, the data frames received periodically in succession at a first rate corresponding to a native frame rate of the media content. The display component may be operative to display the data frames in succession at a second rate corresponding to a native refresh rate of the display component, the display component operative to re-display data frames already shown to maintain the second rate when new data frames have not been received over the display interconnect.

37 Claims, 21 Drawing Sheets

1900

```
RECEIVE MEDIA CONTENT VIA DATA FRAMES OVER A
DISPLAY INTERCONNECT, THE DATA FRAMES
RECEIVED PERIODICALLY IN SUCCESSION AT A FIRST
RATE CORRESPONDING TO A NATIVE FRAME RATE OF
MEDIA CONTENT
1902
```

↓

```
DISPLAY THE DATA FRAMES IN SUCCESSION AT A
SECOND RATE CORRESPONDING TO A NATIVE
REFRESH RATE OF A DISPLAY COMPONENT
1904
```

↓

```
RE-DISPLAY DATA FRAMES ALREADY SHOWN TO
MAINTAIN THE SECOND RATE WHEN NEW DATA
FRAMES HAVE NOT BEEN RECEIVED OVER THE
DISPLAY INTERCONNECT
1906
```

*FIG. 19*

METHOD AND APPARATUS FOR REDUCING POWER USAGE DURING VIDEO PRESENTATION ON A DISPLAY

CROSS-REFERENCE TO RELATED APPLICATIONS

The present application is a continuation-in-part of U.S. patent application Ser. No. 13/536,221, filed Jun. 28, 2012, which is hereby incorporated by reference in its entirety.

BACKGROUND

Refresh rates of televisions and other types of video displays are measured in "Hz" (Hertz). For example, a display that has a typical 60 hz refresh rate represents complete reconstruction of the screen image 60 times every second. However, in the present day, it is typical for digital media such as digital video to be recorded at a native frame rate for that digital medium that is different than a refresh rate for a display device that presents the content of the digital medium during playback. As a result, this means that each video frame for a digital medium that has a native frame rate of 24 frames/sec, for example, is repeated more than once on a display that employs a typical refresh rate. This is evident from the fact that the screen image on the display is updated every 16.6 msec (=1/(60 refresh/sec)) for a 60 Hz refresh rate, while a new image of the digital medium is only uploaded to the display once every 41.6 msec (=1/(24 frames/second)).

In other words, although displays may employ refresh rates that are 60 Hz or higher, there are still only 24 separate frames of the digital medium that are displayed every second, which may need to be displayed multiple times, depending on the refresh rate of the display.

Typically, present day displays such as a liquid crystal display (LCD), plasma display, cathode ray tube, light emitting diode display or other display may have a refresh rate of 60 Hz, 72 Hz, 120 Hz, or other refresh rate that is greater than the native frame rate as in the above-illustrated example. In order to accommodate the difference between the native frame rate of the medium whose visual content is to be viewed and the frame refresh rate of the display to present the visual content, present day techniques employ a complex set of operations. In typical implementations multiple redundant memory reads and writes are performed as frame data is moved from a graphics processor to display electronics, which may require translator functionality from memory to the display engine and from display engine to the display panel. A timing controller (TCON) may be located on the display panel, which additionally performs another translator function to reformat pixel information to drive the display panel's row/column drivers.

In one example, during streaming of content, such as DVD content, graphics logic in a graphics processor or part of a central processing unit may render a new image and write it into the system memory. Subsequently, a translation function may be performed when a display engine reads the content from memory and prepares pixel packets to be ready for transmission to an LCD panel for display of the DVD video content. Upon reception of the pixel packets by the timing controller (TCON) on the LCD panel, another translation function is performed to readjust the pixel values to meet the LCD panel requirements and reform for transmission on an internal bus (typically mini LVDS) to the row/column drivers. This partition between graphics and display may serve some systems adequately, for example, a system that includes a desktop computing device motherboard and an external monitor, but may incur undesirable redundancy and inefficiency for display of video content on other devices such as mobile computing devices. This redundancy and inefficiency may especially be evident from a power consumption perspective, because devices including central processing units (CPU), graphics processing units (GPU) and display interface devices consume an undesirable amount of power to perform the above operations.

Accordingly, there may be a need for improved techniques and apparatus to solve these and other problems.

BRIEF DESCRIPTION OF THE DRAWINGS

FIG. 2 depicts exemplary operation of the system of FIG. 1a.

FIG. 3 depicts further operation of the system of FIG. 1a.

FIG. 19 depicts an exemplary logic flow.

DETAILED DESCRIPTION

Various embodiments involve novel systems, apparatus, and methods to present streaming images on a digital display. Various embodiments are directed to power optimization for the end-to-end data path between system memory and display panel when the native frame rate of a digital medium does not match the refresh rate of the display panel to present a visual representation of the digital medium. Various embodiments are directed to reducing power usage during video presentation on a display, such as where the native frame rate of a digital medium does not match the refresh rate of the display panel.

Some embodiments employ modified operation of a graphics logic component in conjunction with a buffer integrated onto a digital display panel to optimize platform power consumption, such that platform components including central processing unit (CPU), graphics processing unit (GPU), voltage regulators, and/or other components may be placed in a reduced, or low, power mode at least intermittently during operations such as video streaming. In particular embodiments, the duration of lower power mode may extend beyond that afforded by conventional architectures by modifying the manner in which data frames are scheduled to be fetched and transmitted from system memory to the display panel.

In some embodiments, the design and operation of components such as a graphics logic component and display engine, and/or components of a central processing unit, may be altered to modify data frame rendering and transmission of data frames to a display panel. These changes may entail changes in power management hooks that achieve power saving such as power managing of a display interface when no update is required.

Figure 1A:
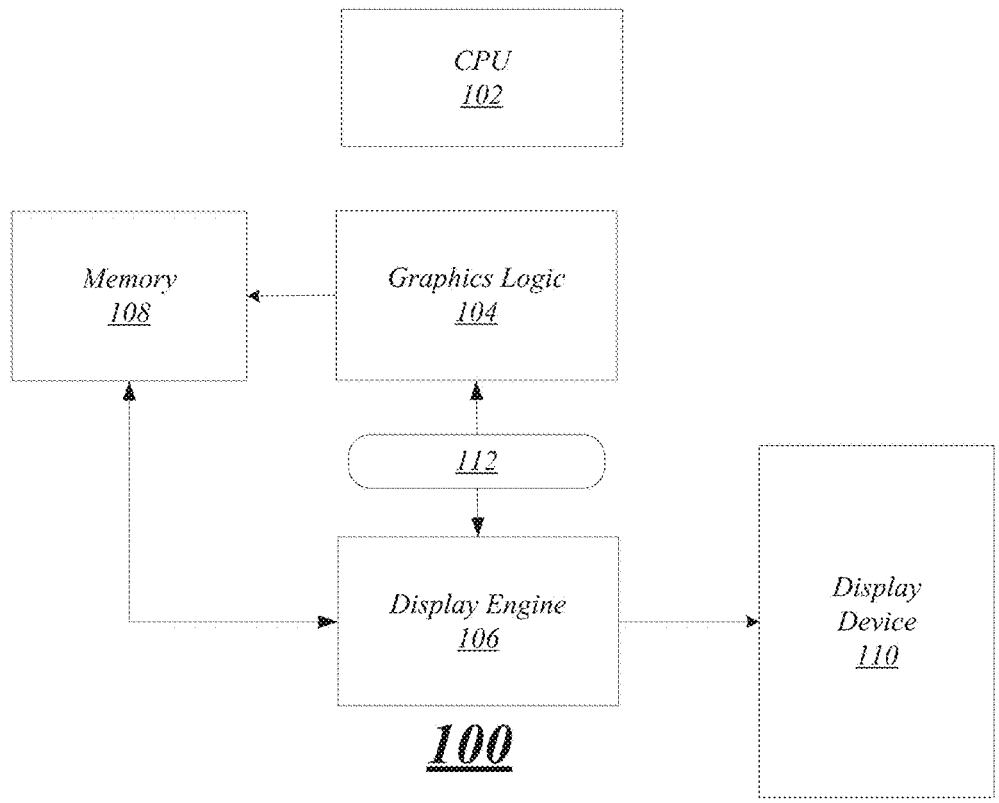
FIG. 1a depicts a block diagram of one system consistent with the present embodiments.

FIG. 1a depicts one system 100 consistent with the present embodiments. The system 100 includes a central processing unit (CPU) 102, graphics logic 104, display engine 106, memory 108, and display device 110. An interface 112 may couple the graphics logic 104 and display engine 106. In some embodiments, the system 100 may be embodied in a mobile device such as a laptop computer, tablet computing device, desktop computer, smartphone, or other electronic computing device or communications device. The embodiments are not limited in this context.

In particular, in various embodiments the CPU 102, graphics logic 104, and/or display engine 106 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The system 100 may execute communications operations or logic to process data received from various sources for presentation on a display, such as display device 110. The data may comprise media content such as video content or other images to be presented in succession on display device 110. Examples of a display device 110 include a liquid crystal display (LCD), light emitting diode display (LED), touch sensitive display, plasma display, cathode ray tube, and other display types.

In various embodiments, the system 110 may include various input devices (not shown) including, but not limited to, keyboards, microphones, mouse, joystick or other navigation devices, and so forth. The user may use such input devices to select media files from one or more media sources (not shown) for viewing on display device 110.

In various embodiments, the data for processing may be received from a digital medium or digital media. A source for digital media may be a digital camera, digital video device, smartphone, tablet computing device, computer, or other device that contain one or more media files that a user or users may wish to view on the display device 110. Other examples of media sources include any hardware or software element capable of storing and/or delivering media information, such as a digital video recorder (DVR), a personal video recorder (PVR), a digital versatile disc (DVD) device, a video home system (VHS) device, a digital VHS device, a disk drive, a hard drive, an optical disc drive a universal serial bus (USB) flash drive, a memory card, a secure digital (SD) memory card, a mass storage device, a flash drive, a computer, a gaming console, a compact disc (CD) player, computer-readable or machine-readable memory, video surveillance system, teleconferencing system, telephone system, wearable computers, portable media players (PMP), portable media recorders (PMR), digital media servers and so forth. The embodiments are not limited in this context. In further embodiments, a digital medium may be a data source that constitutes a combination of hardware elements such as a processor and memory that generates image data periodically, such as machine-generated animation.

It is to be noted that a media source may include data to be presented in audio format as well as visual format. Consistent with the present embodiments, the display device 110 or other devices (not shown) linked to display device 110 may be operative to output audio signals based on digital media content whose images are presented on display device 110.

In various embodiments, the digital media whose content is to be presented on the display device 110 may be a DVD or other medium in which the native frame rate differs from the refresh rate employed by the display device 110. As detailed in the FIGs. to follow, components of system 100 including, among others, graphics logic 104, display engine 106, interface 112, and memory 108, may be interoperable to adjust the processing of media content for presentation on display 110. The media content may be received as streaming data such as video data that is temporarily stored in system 100 while being processed to be shown on display 110. The adjustments in processing of data may include adjusting the timing for storing data in memory 108, for fetching data from memory 108, and transmitting the data to display device 110. As an example, an interface 112, which may be distributed as software, hardware, or a combination of hardware and software between graphics logic 104 and display engine 106, may facilitate handshaking between the graphics logic 104 and display engine 106 to steer new data for streaming to the display device 110.

Figure 1B:
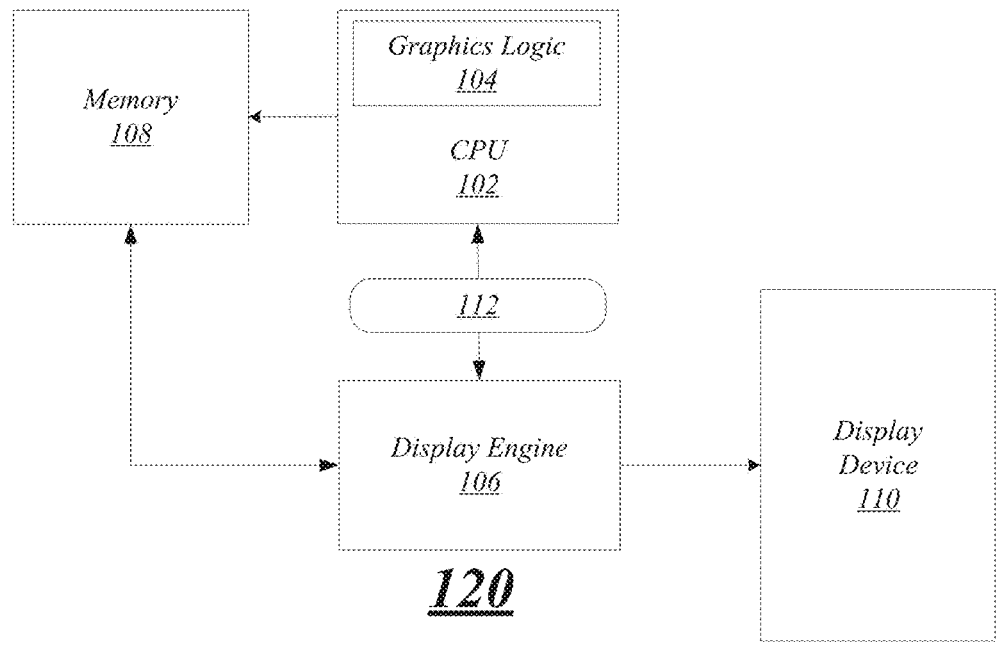
FIG. 1b depicts another block diagram of a system consistent with the present embodiments.

FIG. 1b depicts another block diagram of a system 120 consistent with the present embodiments. The system 120 may include generally similar components as system 100. As illustrated, in the system 120, the graphics logic 104 may be included in the CPU 102. In one particular variant, the CPU 102 may be a "system on a chip" (SOC) component that includes one or more general processors and the graphics logic 104 on a single silicon chip.

Figure 2:
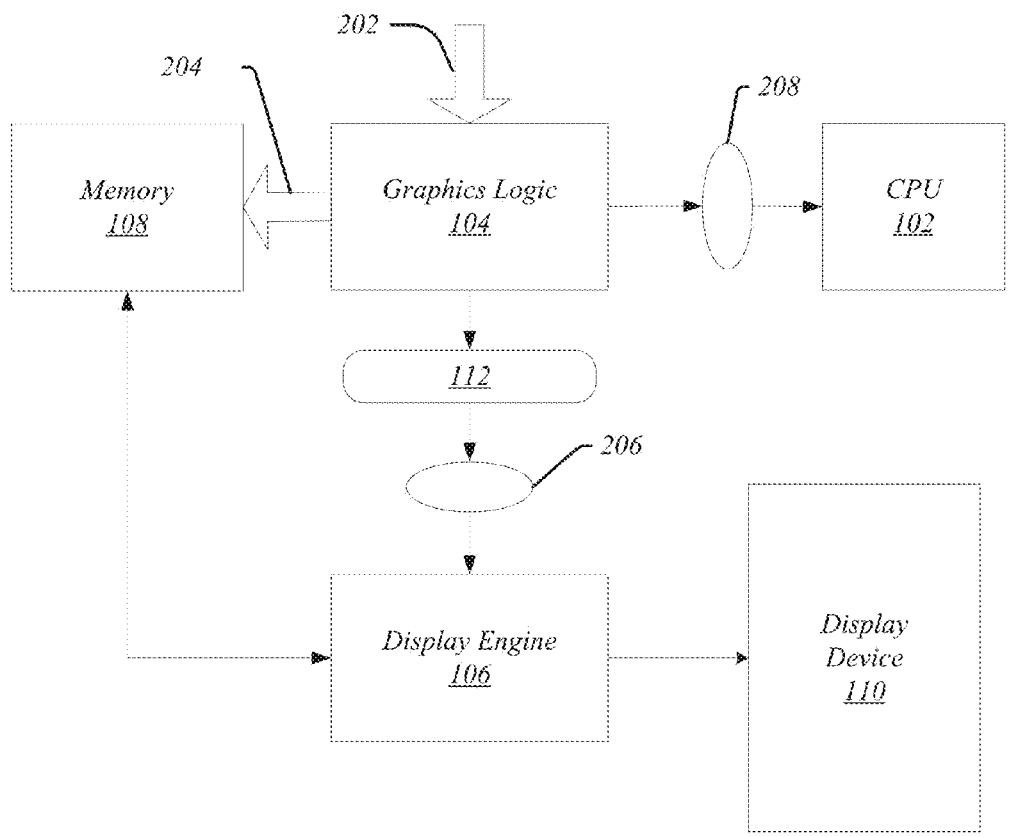

FIG. 2 depicts one example of operation of the graphics logic 104. In the scenario illustrated, the graphics logic 104 receives media content, or data 202, which may be rendered into a set of data frames 204 that can be transmitted to the display 110 for presentation. In various embodiments, the data frames 204 may be video or animation content generated from an external media source or may be machine generated data, such as machine generated animation that is generated in a computer or other device that houses the components 102, 104, 106, 108. In some embodiments, a data frame rate at which the graphics logic 104 receives the data 202 may be several frames per second up to 60 frames per second or higher. In some embodiments, the data frames 204 may be generated from raw data while in other embodiments the data frames 204 may be generated from compressed data.

In one example, video content that is encoded at 24 frames per second is received by graphics logic 104, which renders a set of one or more data frames 204 and transmits the set of data frames 204 for storage in memory 108. Having rendered the set of data frames 204, the graphics logic 104 may thereafter send a signal or message 206 that alerts the display engine 106 that there is a new data frame(s) to be updated. The display engine 106 may transmit each new frame of the set of data frames 204 at the native frame rate of the medium of the data 202, or may send the new data frame within a time period corresponding to the refresh rate of display device 110, such as 16.6 msec, with panel horizontal synchronization/vertical synchronization (Hsync/Vsync) timing.

After data frames 204 are rendered, a signal 208 may also be sent to various components of system 100 to direct the components to enter a lower power mode. For example, the signal 208 may be sent to the CPU 102 to enter a lower power mode. The term "lower power mode" as used herein refers to an operating mode for running an electronic component that consumes less power than an active mode in which circuitry is operating at full voltage and clock frequency. In the case of microprocessor components, the term "lower power mode" may thereby include what are generally referred to as higher C-states or C-modes for operation of a CPU. As is known, in order to save energy when the CPU is or is expected to be idle, the CPU can be commanded to enter a low-power mode. Each CPU may be configured to operate in several power modes and they are collectively called "C-states" or "C-modes."

When a processor, such as a CPU is in active operation, the C-state is generally referred to as C-0, while other, lower power states (modes) are referred to as C-1, C-2, C-3, C-4, C-5, C-6, and so forth. Except for C-0, all other C-states represent what may be considered a state of idleness for the processor, where the higher the C-state, the less power is consumed. The basic purpose of these modes is to cut the clock signal and power from idle units inside the CPU to conserve power. The more units to be halted (by cutting the clock), by reducing the voltage, or even completely shutting down, the more energy is saved.

Consistent with the present embodiments, a signal, such as signal 208, may place other components such as voltage regulators (not shown) and/or a graphics processing unit (GPU) into a lower power mode. The graphics logic 104 may be embodied in the GPU in some embodiments. For example, a GPU may in general operate in different power states (e.g., RC states), which may differ from the C-states of a CPU. In the present embodiments, the signal 208 may place the GPU into an RC-state that represents a lower power state than before the signal 208 was generated.

In additional embodiments, the signal 208 may generate a lower power mode in which the CPU 102 is rendered inactive while the graphics logic 104 remains active. Alternatively, the lower power mode may entail an inactive graphics logic 104 and active CPU 102. As discussed in more detail below, the duration of the lower power mode may be determined according to the timing for sending additional messages 206 to the display engine 106.

Figure 3:
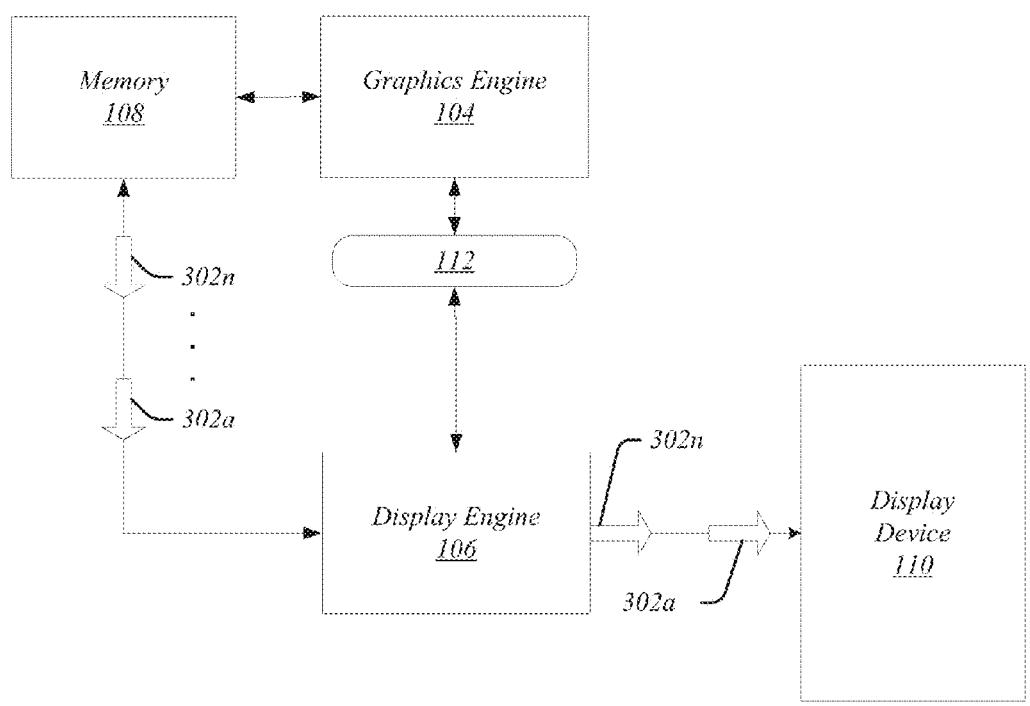

FIG. 3 depicts operation of the display engine 106 consistent with various embodiments. Following the example of FIG. 2, after receipt of a message 206 from the graphics logic 104, the display engine 106 may perform a series of operations to retrieve and transmit data to the display device 110. For example, the message 206 may trigger the display engine 106 to retrieve a series of data frames stored in system memory 108 by graphics logic 104.

In the example depicted in FIG. 3, the display engine 106 retrieves at different instances a series of data frames 302a to 302n, where "a" to "n" may represent any positive integer. Consistent with the present embodiments, the data frames 302a to 302n may be transmitted to the display device 110 in a manner such that the interval (period) between sending of successive data frames corresponds to the period defined by the native frame rate of the medium from which data frames 302a to 302n are created. As discussed below, this may reduce the number of times data is transmitted between memory 108 and display device 110, as well as the number of times data is stored at display device 110 in order to present a given set of data frames, such as a movie, video, or other set of images.

Figure 4:
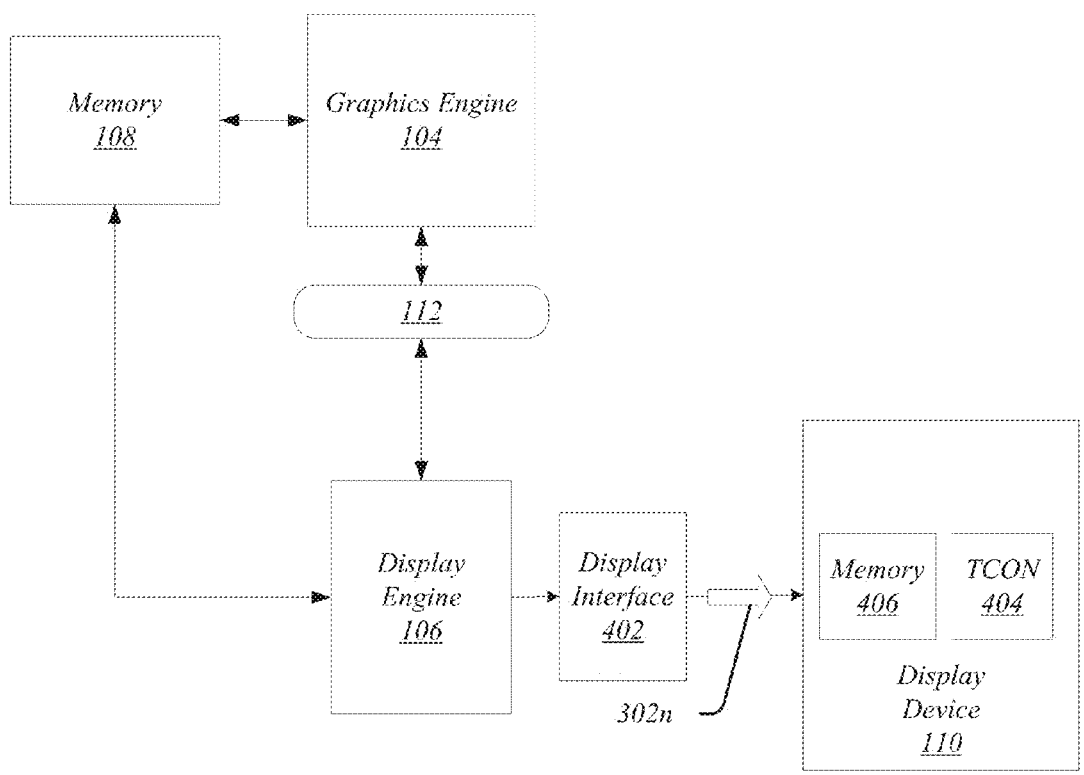
FIG. 4 depicts a block diagram and operation of another system embodiment.

FIG. 4 depicts operation of the display device 110 consistent with the present embodiments. As shown in FIG. 4, a display interface 402 may be provided to facilitate communication between the display engine 106 and display device 110. In some embodiments, the components of the display interface 402 may be distributed between the display engine 106 and display device 110, and may be embodied as software, hardware, or a combination of hardware and software. In the embodiment illustrated in FIG. 4, the display device 110 includes a timing controller (TCON) 404 and memory 406. Consistent with some embodiments, the display interface 402 may support a protocol such as single-frame update protocol, among others. The single-frame update protocol may entail a single-update of video frame content such as a single pulse with a return to idle upon completion of the update.

Following the example of FIGS. 2 and 3, the data frames 302a to 302n may be individually transmitted in succession to the display device 110 at a frequency corresponding to the native frame rate of the medium from which data frames 302a to 302n are created. The timing controller 404 may be operable to store, for example, one frame at a time of data frames 302a to 302n in memory 406. The succession of data frames 302a to 302n may then be stored for an interval required for refreshing the display of display device 110 at its operating (required) refresh rate, which may be a higher rate than the native frame rate of data frames 302a to 302n. Because the display device 110 may store a currently displayed frame to the memory 406, the display device 110 may retrieve the data frame multiple times from memory 406 for presentation on a display screen, depending on the refresh rate of the display (screen). However, the retrieving of a data frame from memory 406 may be performed without requiring a data frame 302a to 302n to be redundantly retrieved and/or sent from memory 108 to the display device 110, as may be the case in conventional streaming of media to a display device. This feature of the present embodiments is detailed in the FIGS. to follow.

Figure 5A:
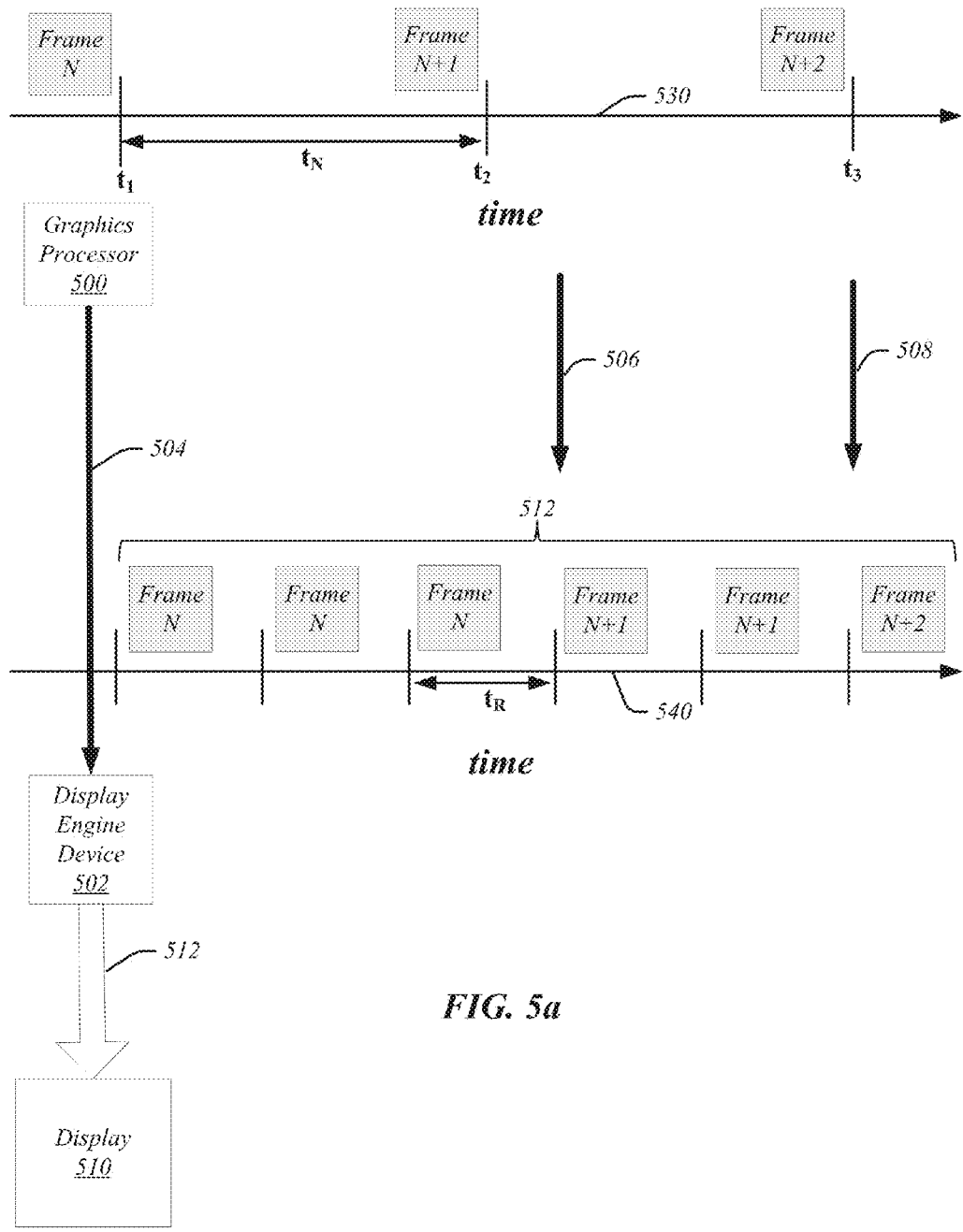
FIGS. 5a and 5b compare operation according to a conventional scheme and an embodiment, respectively.
Figure 5B:
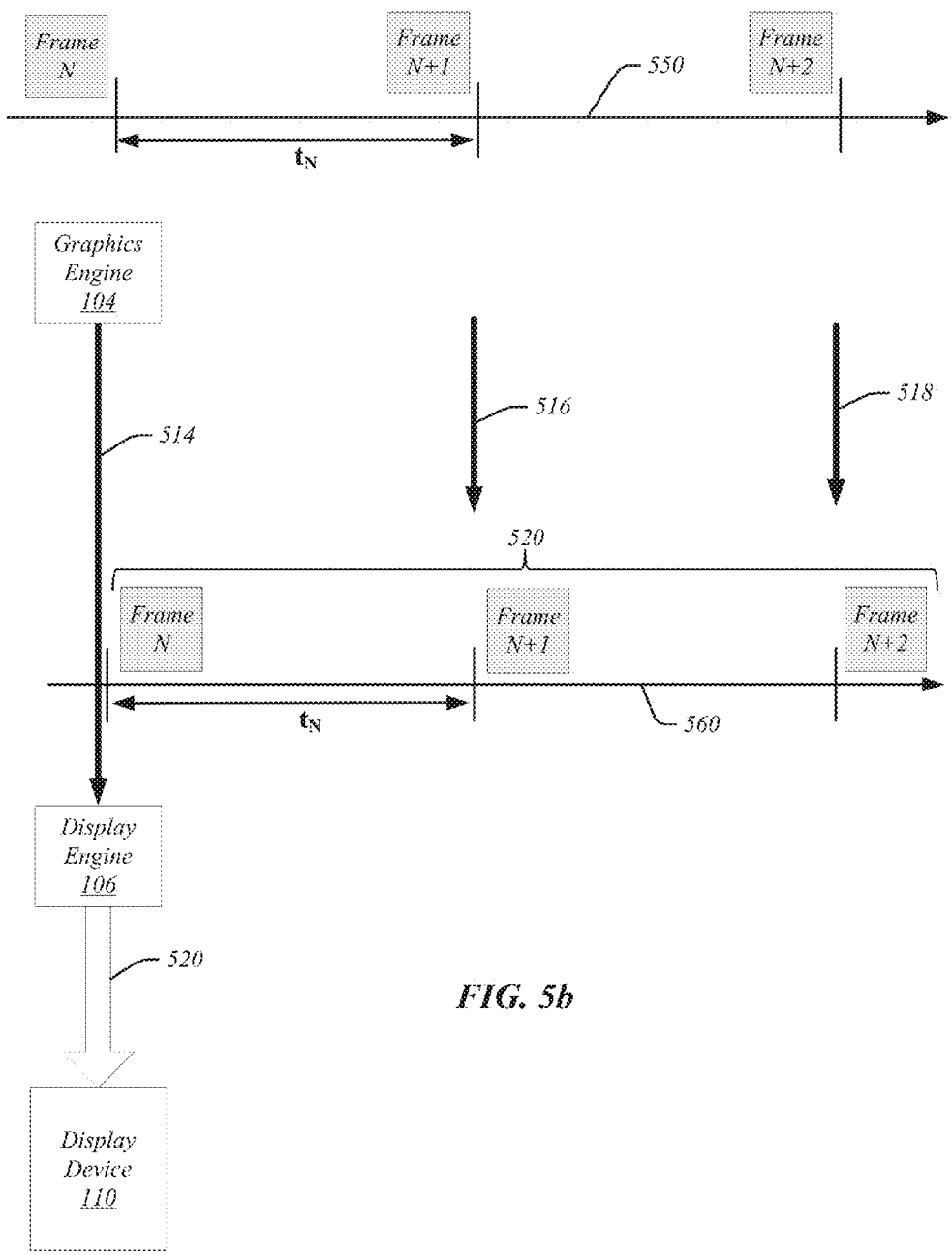

FIGS. 5a and 5b compare the playback of a digital medium according to a conventional scheme and that consistent with the present embodiments. In FIG. 5a, a conventional playback scheme is illustrated in which a graphics processor renders a series of data frames that are transmitted by a display engine device for presentation on a display. In FIG. 5a, the data frame rendering timeline 530 illustrates that a graphics processor 500 renders a series of data frames N, N+1, N+2 at an interval $t_N$ that corresponds to a native frame rate, which may be 24 frames per second in the case of a DVD media source. Thus, the value of $t_N$ may be 1/24 seconds, or about 41.6 msec for a DVD playback example.

Upon rendering of the frame N the graphics processor 500 sends a signal 504 which may trigger the display engine device 502 to retrieve the frame N for sending to the display 510. In accordance with known schemes, the signal 504 may constitute a control signal such as what a frame buffer flip notification, in which the signal indicates the memory from which the currently rendered frame, that is, frame N, may be retrieved. During processing of received data from a media source the graphics processor 500 may store a data frame being constructed in a memory that is designated as a "back buffer." When the data frame N is ready to be transmitted, the issuing of a frame buffer flip notification may switch the designation of the back buffer where the data frame is currently stored, such that the former back buffer is designated as a "front buffer" from which data is to be retrieved by the display engine device 502. Each time the graphics processor generates a signal such as a frame buffer flip notification, the display engine device 502 is alerted to the current path for retrieving the updated data frame to be transmitted to the display 510.

As further depicted by the data frame retrieval timeline 540 in FIG. 5a, the display engine device delivers to the display 510 media content 512 that contains the data frames N, N+1, N+2 at a series of different instances. However, in the example specifically illustrated in FIG. 5a, it is assumed that the display refresh rate of display 510 is 60 Hz, meaning that the display is refreshed multiple times between the instances $t_1$, $t_2$, $t_3$ at which a new data frame is rendered. In particular, the interval $t_R$ corresponding to a refresh rate of 60 Hz is equal to 16.6 msec. In order to reconcile the longer interval of $t_N$ (41.6 msec) that spans the time between rendering of successive data frames N, N+1, N+2 during playback at 24 frames per second with the shorter interval $t_R$ between successively refreshed screen displays on display 510, each data frame is fetched by the display engine device 502 multiple times and transmitted at least twice to the display 510.

In the example of FIG. 5a, in order to reconcile the different timing between DVD frame rate and display refresh rate, the display engine device 502 retrieves a first data frame three separate times and transmits the data frame to the display device 510, followed by fetching and transmitting a next data frame to display device 510 on two separate occasions. For example, frame N is sent to display device three separate times at an interval of 16.6 msec, while frame N+1 is sent twice, as shown in FIG. 5. In one implementation, after the frame N is sent three times, a signal 506 is sent from graphics processor 500 to display engine device 502, which signal may constitute a frame buffer flip notification that indicates that the frame N+1 is ready to be retrieved from a (now) front buffer designated by the signal 506. Consequently, the frame N+1 is delivered twice, after which a signal 508, constituting a further frame buffer flip notification, is sent to display engine device 502. The signal 508 indicates the buffer for retrieving a subsequent data frame N+2, to be sent to display 50 at total of three times, followed by a data frame N+3 (not shown) to be sent twice, and so forth. The total duration of five transmissions of two successive data frames at an interval $t_R$ of 16.6 msec spans 83 msec, or two times the 41.6 msec interval for the 24 frame per second frame rate $t_N$.

As is evident from FIG. 5a, a rendered data frame is fetched from system memory and transmitted an average of 2.5 times to the display 510 in order to provide a relatively smooth presentation of a streaming media having a native frame rate of 24 frames per second. This may present an undesirable number of operations to support streaming of the media to be played back on display 510, which may incur an undesirable amount of system power.

Consistent with the present embodiments, FIG. 5b depicts a scheme for playback of a digital medium where the frame rate of the digital medium differs from that of the display device that avoids problems engendered by the scheme shown in FIG. 5a. For the purposes of comparison to FIG. 5a, the frame rate of the digital medium may be assumed to be 24 frames per second and the refresh rate of the display device 50 Hz. As shown in FIG. 5b, the graphics logic 104 may render a series of data frames to playback media on a display device 110. In particular, the data frame rendering timeline 550 in FIG. 5b illustrates the rendering of a series of data frames N, N+1, N+2 at an interval $t_N$ that corresponds to a native frame rate, which may be 24 frames per second as in the example of FIG. 5a, thereby producing a value of $t_N$ of 41.6 msec. When data is received by the graphics logic 104, the rendered data frame may be stored in system memory, such as memory 108. Although the data may be rendered and stored at regular intervals as suggested by FIG. 5b, the interval between each successive data frame N, N+1, N+2 may not be the same. However, on average, a new data frame may be stored to system memory every ¹⁄₂₄ second, or approximately 41.6 msec during playback of a digital medium such as DVD. As further depicted by the data frame retrieval timeline 560 in FIG. 5b, the display engine 106 may then deliver to the display device 110 media content 520 that contains the data frames N, N+1, N+2 at a series of different instances.

In particular, as illustrated in FIG. 5b, after rendering of the data frame N the graphics logic 104 may send to display engine 106 a signal 514, which may constitute a frame buffer flip notification as described above with respect to FIG. 5a. At time $t_4$ the display engine 106 may then retrieve the stored data frame N from a buffer designated by the signal 514, and forward the data frame N to display device 110. Subsequently, when the data frame N+1 is rendered and stored in memory 108, the graphics logic 104 may send a signal 516, which may alert the display engine 106 that a subsequent data frame N+1 is stored in the buffer designated by the signal 516 and is ready for transmission to the display device 110. In contrast to the scenario of FIG. 5a, however, during the interval between sending of consecutive signals 514 and 516, the display engine 106 only fetches and transmits frame N to display device 110 in a single instance, that is, at a single time. In this manner, the rate of rendering data frames and transmitting the data frames to the display may match one another, thereby eliminating the redundancy illustrated in FIG. 5a. As shown in FIG. 5b, the media content 520 sent from display engine 106 to the display device 110 includes only one copy each of the data frames N, N+1, and N+2. Because the display device 110 may include a timing controller 404 and memory 406 (see FIG. 4) that may store at least one data frame, the display device 110 may refresh its display screen with the presently stored data frame according to the set refresh rate for the display device 110, for example, every 16.6 msec, even though a new data frame is received from display engine 106 only at intervals of 41.6 msec for 24 frame/sec frame rate.

An advantage of the arrangement depicted in FIG. 5b is that the intervals between performing tasks such as fetching and distributing data frames to a display are extended as compared to conventional techniques in which data frames may be shipped from system memory to display at a rate corresponding to the display panel refresh rate. Once a signal such as a frame buffer flip notification is issued by the graphics logic 104 indicating a current data frame to be transmitted for display, various components of a system including a CPU and graphics logic may be placed in a lower power mode for an interval until subsequent data is to be processed to render new data frame(s). In one example of DVD streaming at 24 msec frame rate, this interval may correspond to the remaining portion of the 41 msec duration for $T_N$, during which the CPU 102 and graphics logic 104 may enter a lower power mode. In cases in which at least portions of the CPU are to remain awake to perform non-graphics, non-display related processing, the display-related data path may remain idle, thereby realizing power saving over conventional schemes.

In various additional embodiments, a graphics logic 104 may render multiple data frames 204 at one time so that data frames 204 can be prepared in advance of the time the data frames 204 are to be transmitted to a display. For example, the graphics logic 104 may be operable to look ahead in its command queue to process a limited number of data frames ahead of the data frame currently being transmitted for display.

Figure 6:
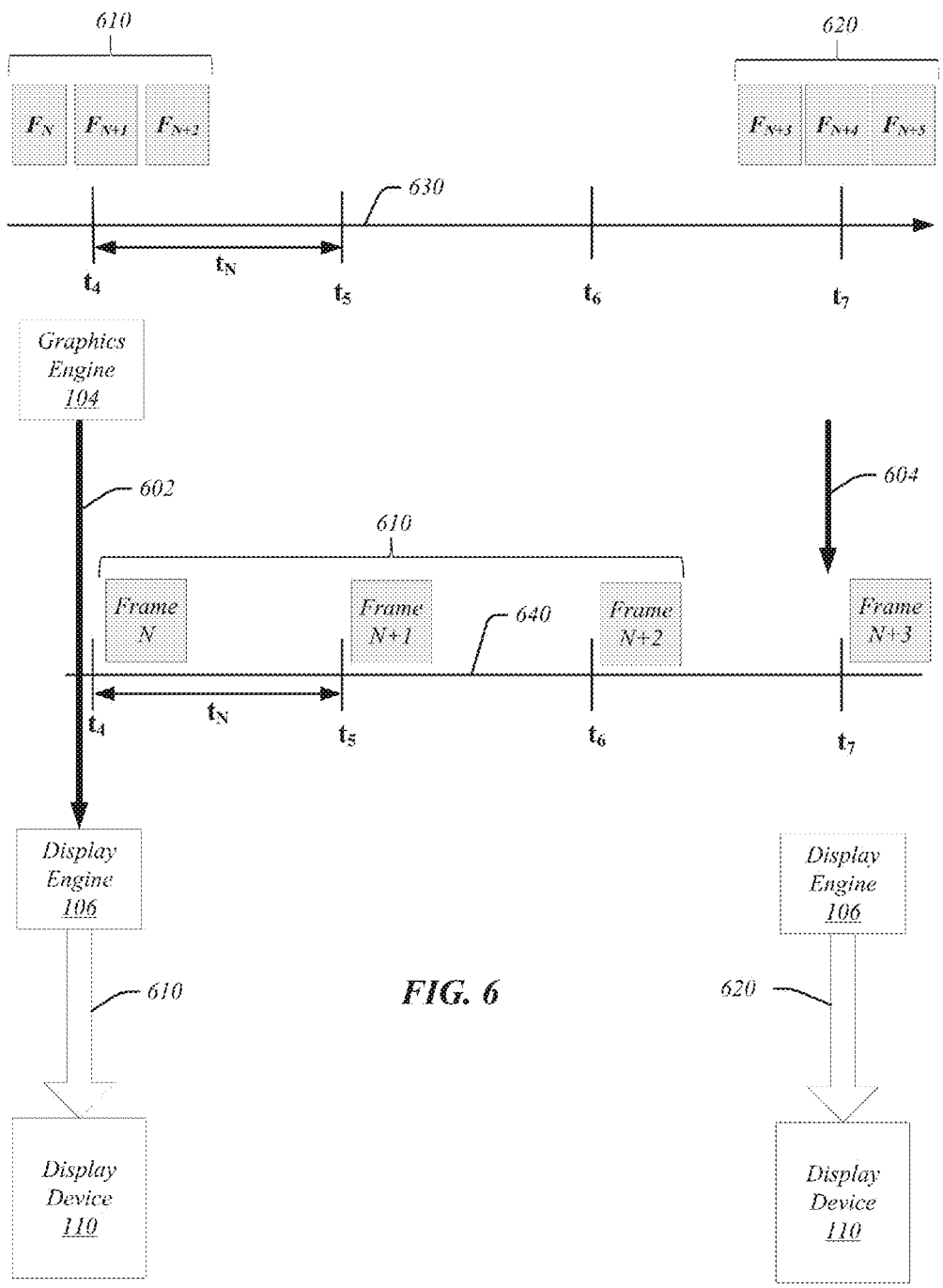
FIG. 6 depicts operation of another embodiment.

FIG. 6 depicts an embodiment in which the graphics logic 104 prepares three data frames at a time. As illustrated the data frame rendering timeline 630, at the time $t_4$, the graphics logic 104 prepares media content 610 that comprises data frames $F_N$, $F_{N+1}$, and $F_{N+2}$. After receiving a signal 602 from the graphics logic 104, as shown by the data frame retrieval timeline 640 the display engine 106 may transmit the media content 610 where successive data frames are sent to the display device 110 at a series of instances $t_4$, $t_5$, $t_6$ separated by the interval $t_N$. Subsequently, at the time $t_7$, the graphics logic 104 may prepare a further set of media content 620, which may include three additional data frames $F_{N+3}$, $F_{N+4}$, and $F_{N+5}$. These new data frames may be stored to memory 108 and a signal 604 may be sent to display engine 106. Subsequently, the display engine 106 may send to the display 110 at a series of instances the media content 620 as a series of data frames $F_{N+3}$, $F_{N+4}$, and $F_{N+5}$, beginning with $F_{N+3}$ which is sent at $T_7$. During the interval between preparing (rendering) a first set of three data frames and sending a signal 602, and the time for preparing the next set of data frames for transmission, the CPU 102 and/or graphics logic 104 may go to sleep, that is, may enter a lower power mode. In the example of FIG. 6, assuming a frame rate of 24 frames per second, the duration of the lower power mode may extend over multiple $t_N$ intervals, where each $t_N$ interval is 41.6 msec. Thus, the lower power mode may extend for over 100 msec before the CPU 102 and graphics logic 104 are to wake up to begin processing further sets of data frames.

Figure 7:
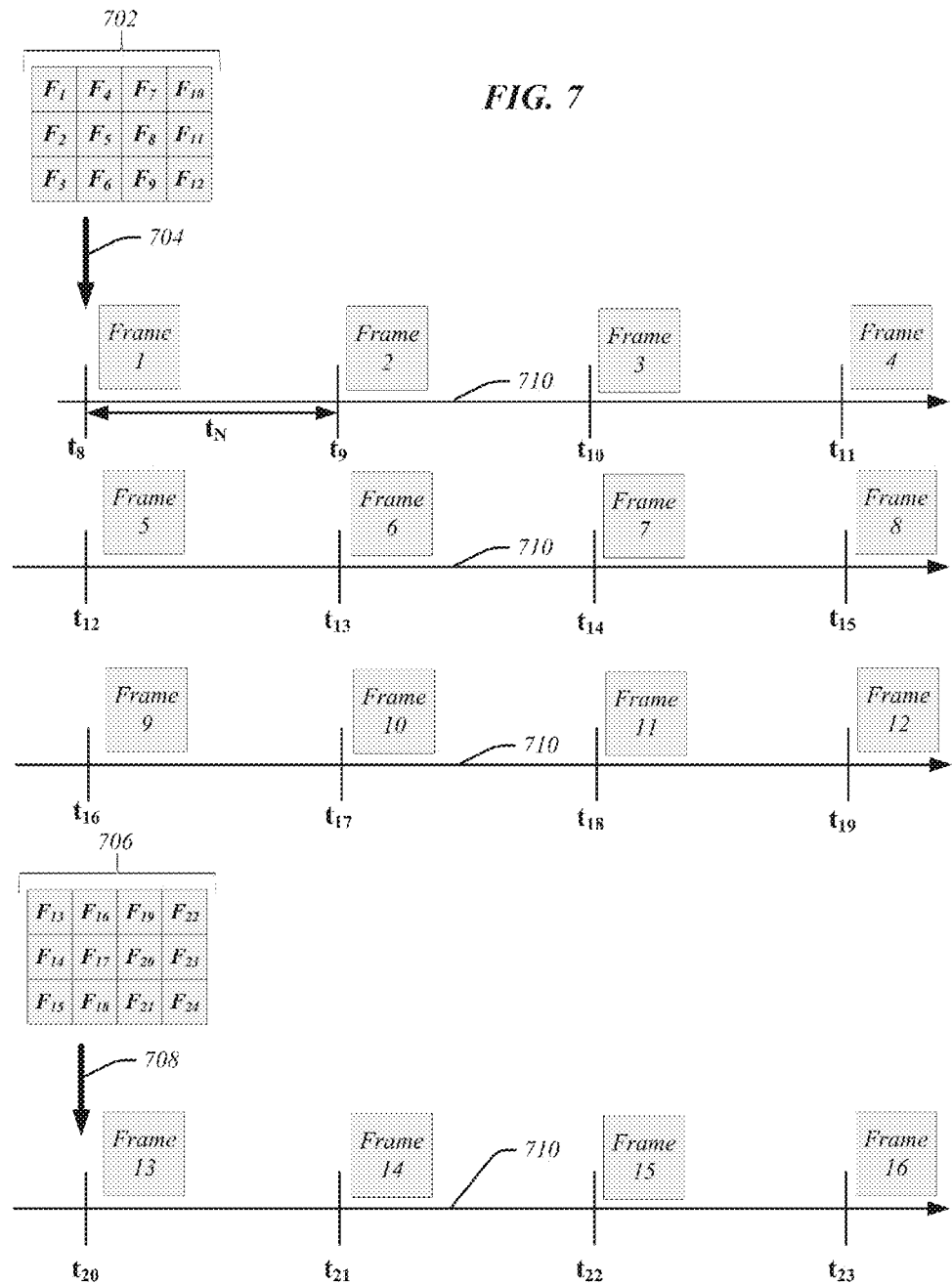
FIG. 7 depicts operation of a further embodiment.

Because of the advanced ability of modern graphics processors, it is possible for graphics logic to render many data frames in advance, for example up to about thirty data frames. FIG. 7 depicts a further embodiment in which twelve data frames are rendered at a time. A graphics logic component (not depicted in FIG. 7) may prepare media content 710 comprising frames $F_1$ to $F_{12}$ at the time $T_8$ as shown in FIG. 7.

After receiving a signal 704 from the graphics logic, as shown by the data frame retrieval timeline 710, the display engine (also not explicitly shown) may transmit the media content 702 where twelve successive data frames $F_1$ to $F_{12}$ are sent to a display device (not shown) at a respective series of instances $t_8$ to $t_{19}$, separated by the interval $t_N$. Subsequently, at the time $t_{20}$, the graphics logic may prepare a further set of media content 706, which may include twelve additional data frames $F_{13}$ to $F_{24}$. These new data frames may be stored to memory and a signal 708 may be sent to display engine, which may send to the display at a series of instances the media content 706 as a series of data frames $F_{13}$, to $F_{24}$, beginning with $F_{13}$ sent at $T_{20}$. As in the case of FIG. 6, during the interval between preparing (rendering) a first set of twelve data frames and sending a signal 704, and the time for preparing the next set of data frames for transmission, the CPU and/or graphics logic may go to sleep, that is, may enter a lower power mode. In the example of FIG. 7, again assuming a frame rate of 24 frames per second, the duration of the lower power mode may extend over multiple $t_N$ intervals, where each $t_N$ interval is 41.6 msec. Thus, the lower power mode may extend for a factor of about eleven times or more the interval $t_N$ depending on the total time required for the CPU/graphics logic to enter and exit a lower power mode and the total time to prepare each set of twelve data frames. In this manner, neglecting any non-graphics, non-display related processing, the lower power mode may extend for up to about 500 msec (=12×41.6 msec) in the example of FIG. 7.

Although FIGS. 5b, 6 and 7 provide examples that facilitate extending duration of lower power mode while processing media, such as DVD, the present embodiments are not limited to processing media.

Figure 8:
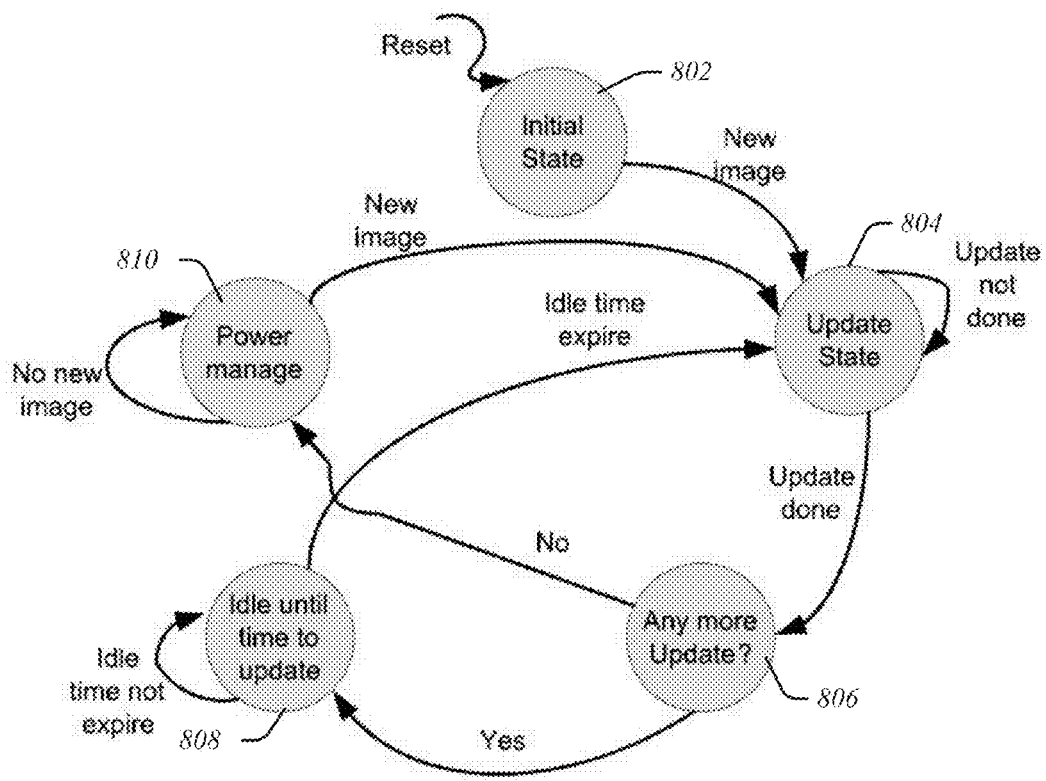
FIG. 8 depicts a state flow diagram in accordance with various embodiments.

FIG. 8 depicts a state flow diagram in accordance with various embodiments. When a system is in an initial state 802 and a new image is received, the flow moves to 804, where the state is updated. The system remains in at update state 804 until the current updating is complete, after which a decision is made at 806 if further updates are to be done. If so, the flow moves to 808 in which the system enters an idle state until the idle time expires. Subsequently the flow returns to 804 where an additional system update is performed. If no further system updates are to be performed, the flow moves to 810 at which the system enters a power management state. During the power management state if no new images are received, the system may remain in the power management state, which may place one or more of various components, such as a CPU, GPU, voltage regulators, display interface, and so forth, into a lower power mode. When a new image is received while the system is in the power management state, the flow returns to 804, where further updating is performed.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 9:
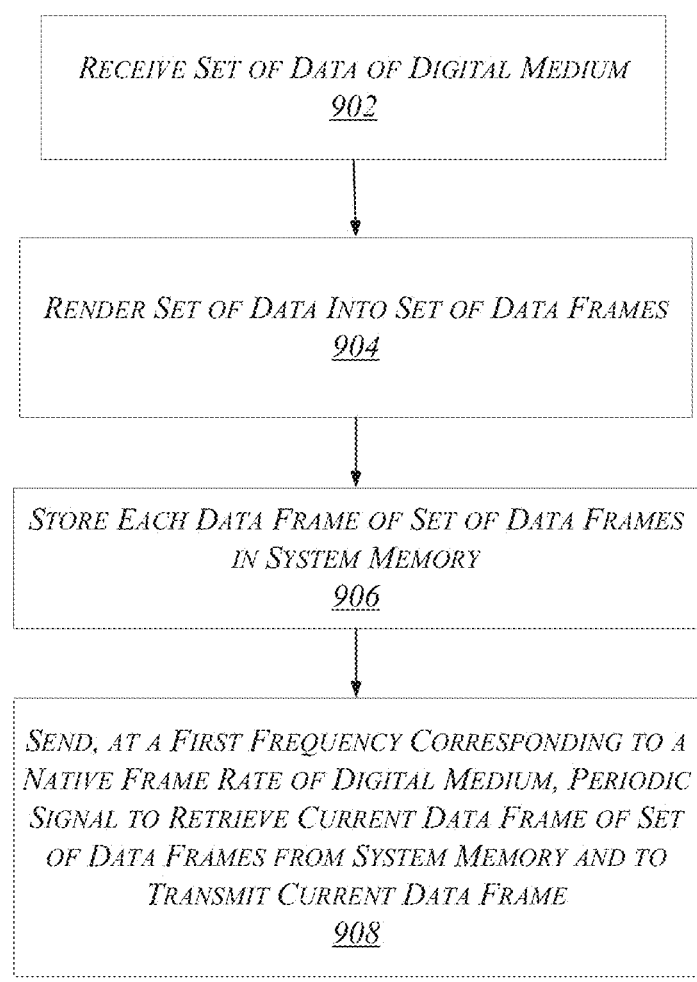
FIG. 9 presents an exemplary first logic flow.

FIG. 9 depicts an exemplary first logic flow 900. At block 902, a set of data of a digital medium is received. The data may include image data, such as data to construct data frames for presentation on a display. At block 904, the set of data is rendered into a set of data frames. At block 906, the set of data frames is stored to a memory. For example, the set of data frames may be stored to a buffer for subsequent transmission to a display to present the data frames as a video presentation. At block 908, a periodic signal is sent at a first frequency corresponding to the native frame rate of the digital medium to retrieve the current data frame of the set of data frames from the system memory and to transmit the current data frame. In one example, a graphics processor or graphics logic may send a frame buffer flip notification to a display engine that directs the display engine to system memory "front buffer" where the next data frame to be transmitted to a display device is stored.

Figure 10:
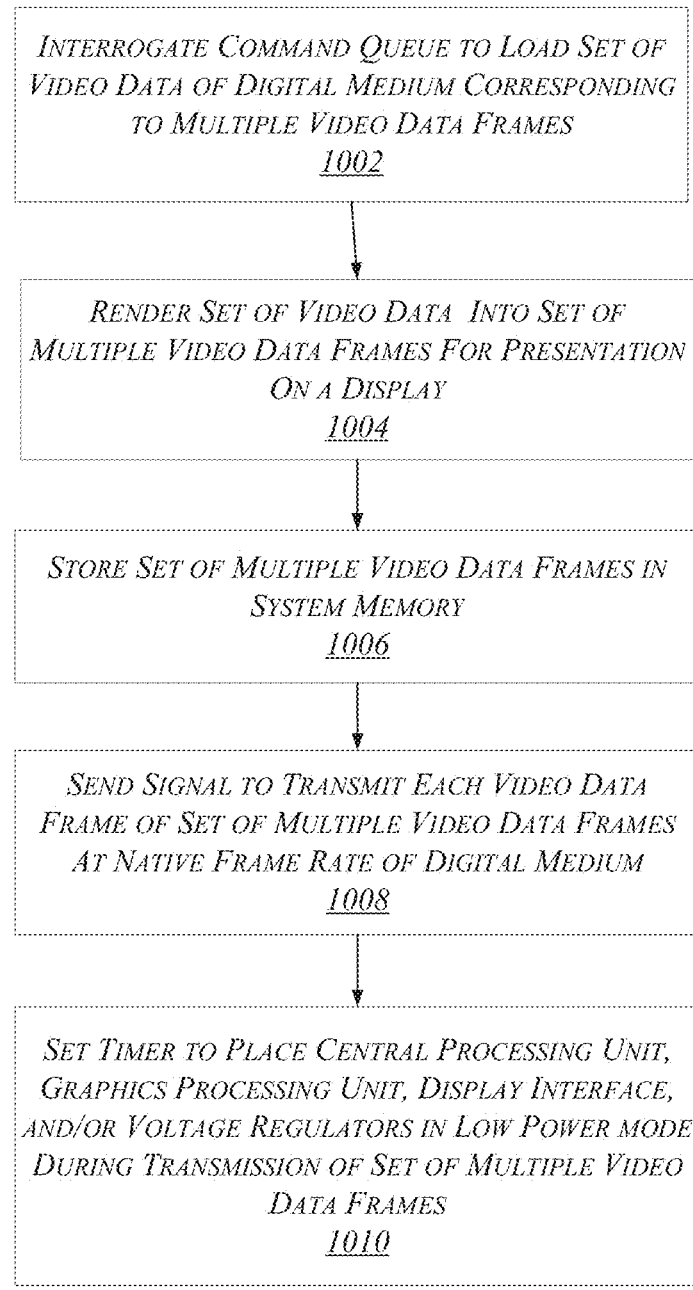
FIG. 10 depicts an exemplary second logic flow.

FIG. 10 depicts an exemplary second logic flow 1000. At block 1002, a Command Queue is interrogated to load a set of video data of a digital medium. In one example, during playback of a digital medium, a graphics processor may look forward in the queue to capture video data of the digital medium that corresponds to multiple video data frames ahead of a video data frame that is currently being transmitted for display.

At block 1004, a set of video data of the digital medium is rendered into multiple video data frames, and at block 1006, the multiple video data frames are stored to system memory.

At block 1008, a signal is sent to transmit each video data frame of the set of multiple video data frames at a native frame rate of the digital medium. For example, graphics logic may direct the display engine to retrieve a video data frame from system memory once every 41.6 msec in the case of 24 frames per second DVD playback.

At block 1010, a timer is set to place components such as a central processing unit, graphics processing unit, display interface and/or voltage regulator into a lower power mode during the transmission of the set of multiple video data frames. In an example of 24 frame per second DVD playback characterized by a 41.6 msec interval between transmission of successive data frames, the timer for the lower power mode may not expire for up to 500 msec or even one second depending upon the number video data frames in the set that are transmitted.

Figure 11:
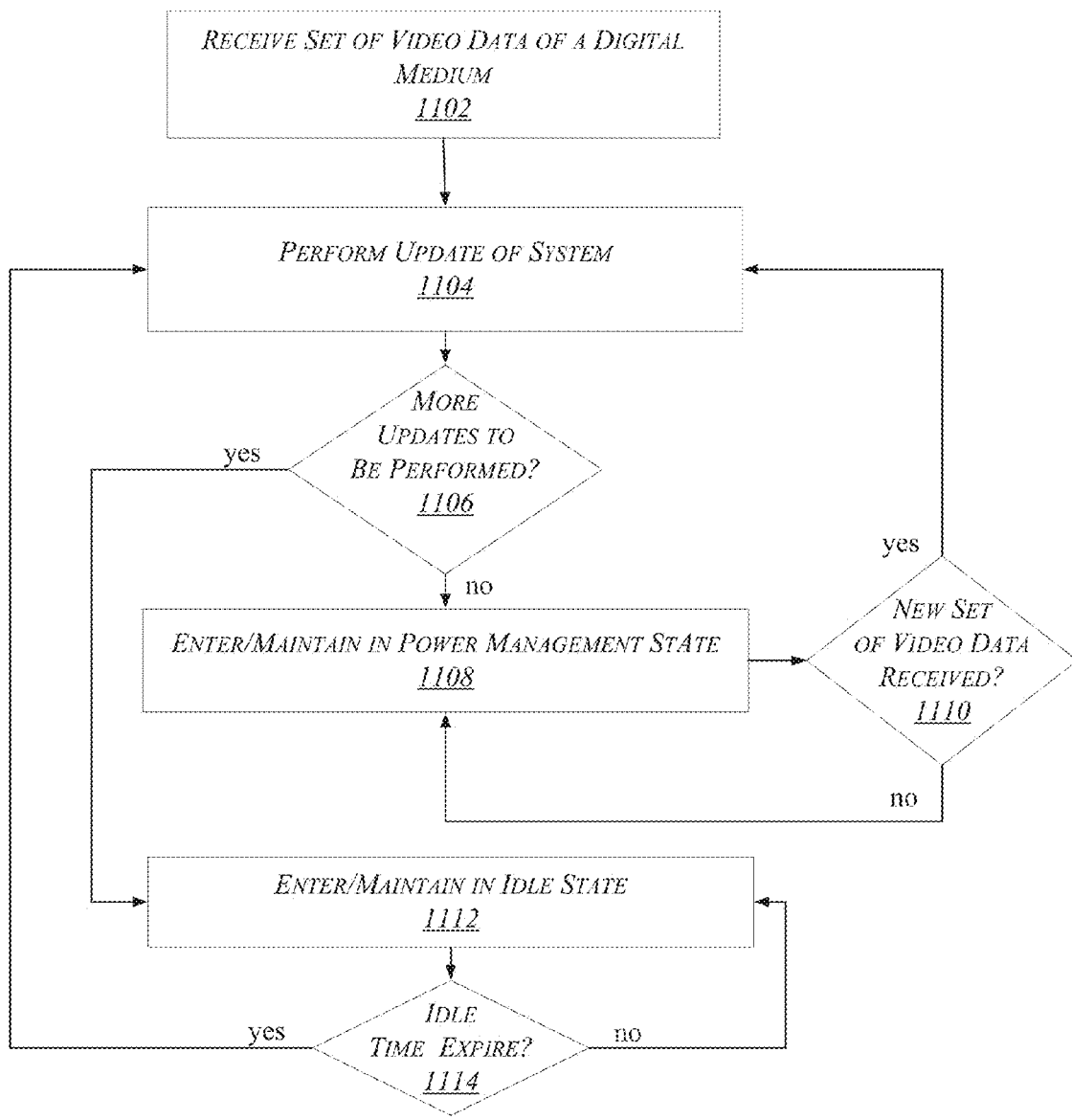
FIG. 11 depicts an exemplary third logic flow.

FIG. 11 depicts an exemplary third logic flow 1100. At block 1102, a set of video data of a digital medium is received by a system. At block 1104, a system update is performed. The flow then proceeds to block 1106, where it is determined whether additional updates are to be performed. If no additional updates are to be performed, the flow proceeds to block 1108 where the system enters a power management state. A power management state may correspond to a higher C-state for a system processor, such as a C-1 to C-6 state, in which one or more components of the processor are inactivated or placed in a lower performance state than when the system processor in an active (C-0) state. The flow then proceeds to block 1110 where a determination is made as to whether a new set of video data has been received.

If, at block 1110, it is determined that new video data has been received, the flow returns to block 1104, where the system is updated. If, at block 1110, no new video data has been received, the flow returns to block 1108, where the system is maintained in a power management state.

If, at block 1106, it is determined that more system updates are to be performed, the flow proceeds to block 1112. At block 1112, the system enters an idle state. The system may set an idle timer corresponding to an interval for the system to remain in the idle state before further system updates are to be performed. The flow then proceeds to block 1114, where a determination is made as to whether the idle timer has expired. If not, the flow returns to block 1112 where the system maintains in an idle state. If so, the flow moves to block 1104 where further system updating is performed.

Figure 12:
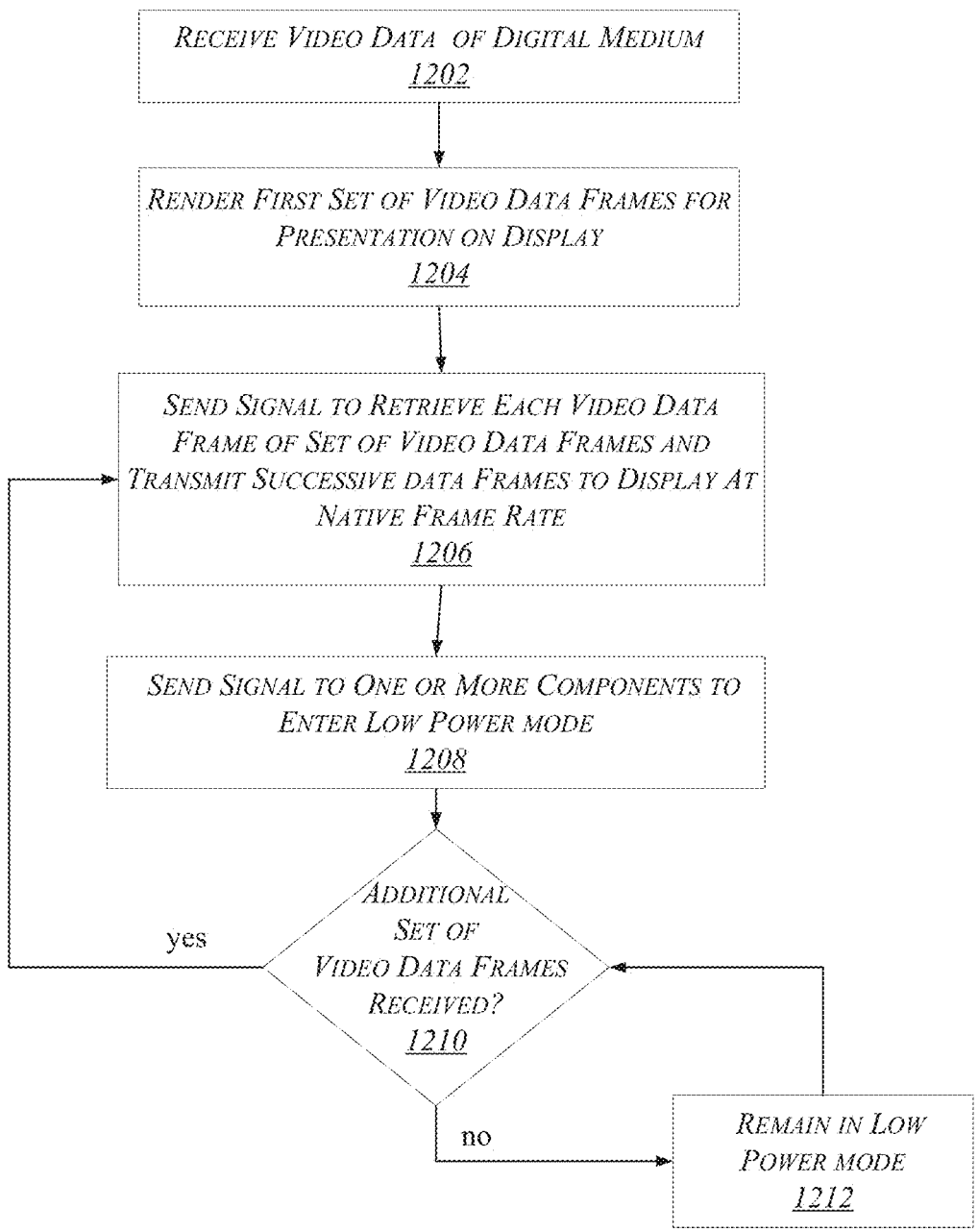
FIG. 12 depicts an exemplary fourth logic flow.

FIG. 12 depicts an exemplary fourth logic flow 1200. At block 1202 video data of a digital medium is received. At block 1204, a first set of video data frames is rendered for presentation on a display based upon the received video data. At block 1206 a signal is sent to retrieve each video data frame of the set of video data frames and to transmit successive data frames to a display at the native frame rate of the digital medium. For example, the signal may direct a display engine to a set of multiple video data frames that are stored in system memory for transmission to the display at a frame rate of 24 frames per second.

At block 1208, a signal is sent to one or more components to enter a lower power mode. In one example, the lower power mode may correspond to a higher C-state for a processor. The flow then proceeds to block 1210 where a determination is made as to whether any additional set of video data frames has been received. If not, the flow moves to block 1212, where the system remains in lower power mode. If so, the flow returns to block 1206.

Display-Side Power Saving

The previous embodiments describe reducing the number of times data is transmitted between memory 108 and display device 110, as well as the number of times data is stored at display device 110 in order to present a given set of data frames, such as a movie, video, or other set of images. To accomplish this, various techniques may be implemented to ensure that the display device 110 is capable of correctly responding to the various strategies employed in eliminating the duplicate transmission of data frames.

Figure 13:
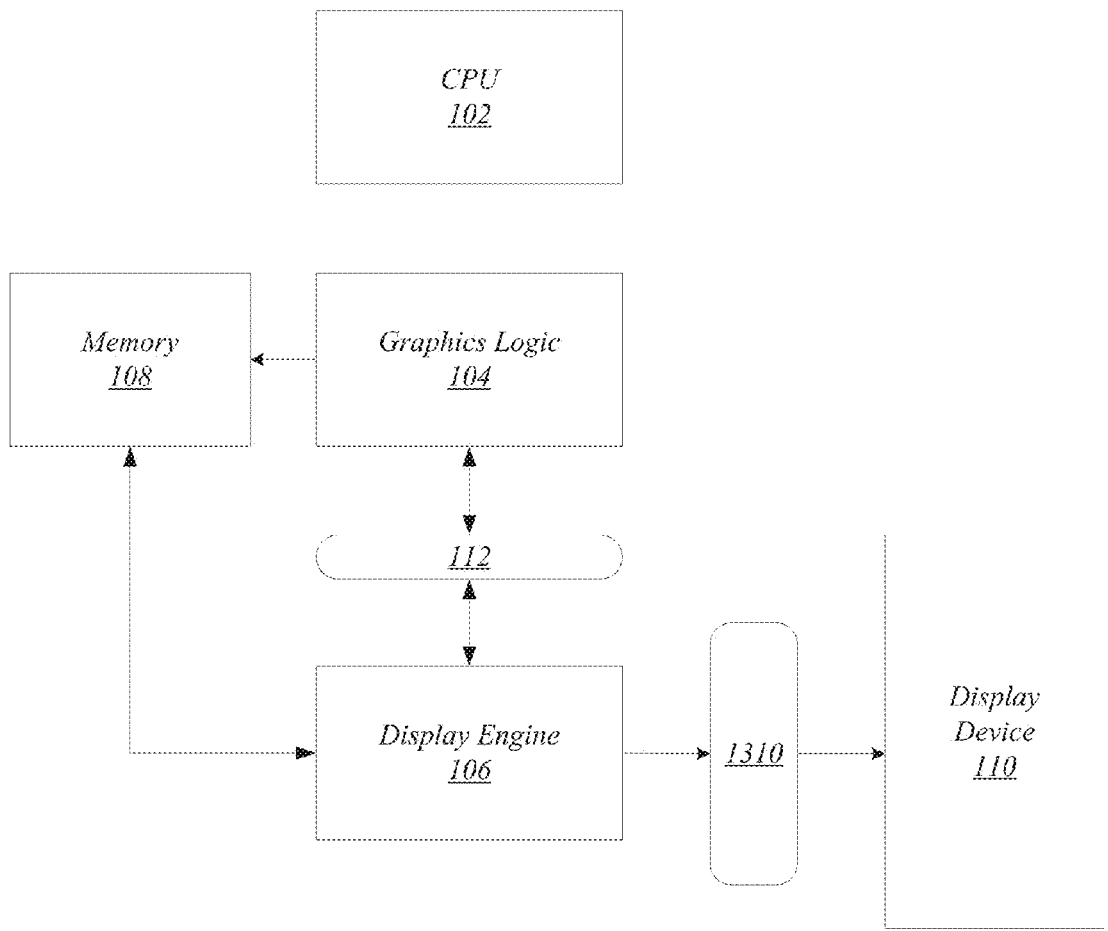
FIG. 13 another block diagram of a system consistent with the present embodiments.

FIG. 13 depicts another block diagram of a system consistent with the present embodiments. The system 1300 may include generally similar components as systems 100 and 120. In FIG. 13, a display interconnect 1310 is illustrated connecting the display engine 106 to the display device 110. Display interconnect 1310 may comprise any one of the known technologies for connecting a display engine 106 and a display device 110, including, without limitation, a Digital Visual Interface (DVI) interconnect or a High-Definition Multimedia Interface (HDMI) interconnect.

Figure 14:
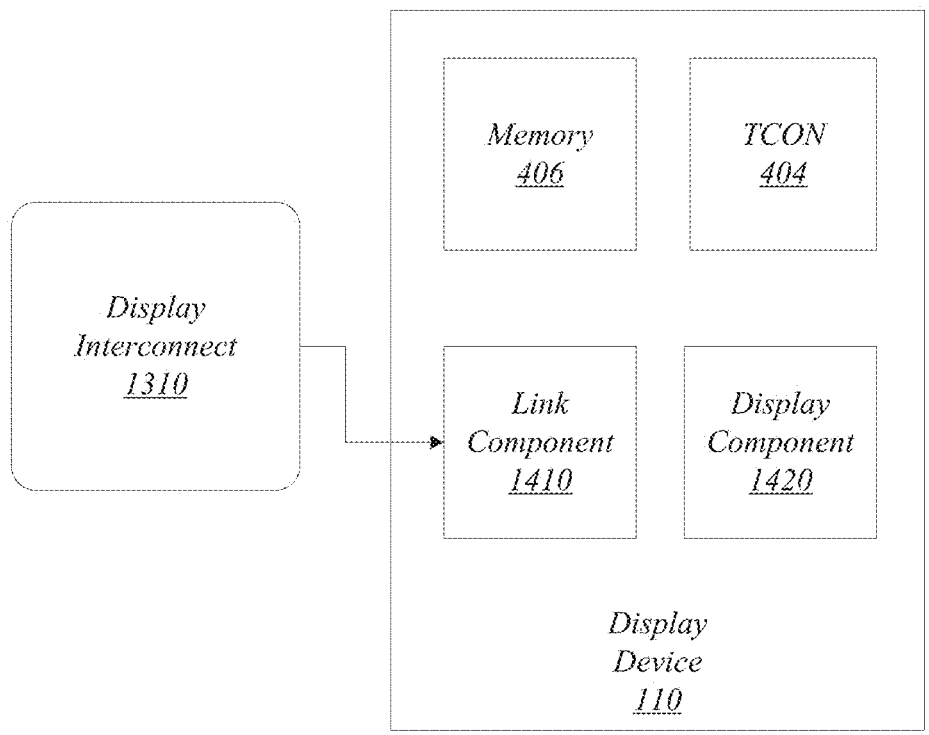
FIG. 14 depicts a block diagram of an expanded illustration of a display device.

FIG. 14 depicts a block diagram of an expanded illustration of a display device 110. As shown in FIG. 14, display device 110 may further comprise a link component 1410 and a display component 1420 in addition to the memory 406, TCON 404, and display interconnect 1310.

In various embodiments, the link component 1410 may be operative to receive data frames over the display interconnect 1310, the data frames received periodically in succession at a first rate corresponding to a native frame rate of media content being received via the data frames over the display interconnect 1310. A native frame rate may refer to the frame rate used in the encoding and decoding of media content. For instance, encoded film content may run at 24 frames per second (fps) while encoded television content may run at 30 fps.

In some embodiments, the link component 1410 may comprise a link interface. The link component 1420 may comprise receiving logic that couples the incoming display interconnect 1410 with the rest of the display device. The link component 1420 may be generally operative to receive frames over the display interconnect 1310 and to pass the frames onto the rest of the display device. In some embodiments, the link component 1410 may comprise a hardware link component implemented in hardware logic. In some embodiments, the link component 1410 may comprise a software link component implemented in software logic. In some embodiments, the link component 1410 may be implemented as a hardware component or software component of a processor. It will be appreciated that a processor may not specifically refer to a central processing unit (CPU) or graphical processing unit (GPU) but instead to a hardware unit operative to perform the task of coupling the incoming display interconnect 1310 with the rest of the display device.

The display component 1420 may be operative manage and perform the display of frames on a screen of a display device. In some embodiments, the display component 1420 may be or may be part of a display controller, a display controller generally a device in a display subsystem that transfers a frame buffer to the screen. In some embodiments, the display component 1420 may be external to the display controller and manage the transfer of frames to the display controller.

In some embodiments, the display component 1420 may comprise hardware logic either internal or external to the display controller. Where a display component 1420 comprises hardware logic, it may be said to be on a processor to indicate that the hardware logic is integrated with a processor as part of a display device, the processor operative to manage and perform the display of frames on a screen of a display device. It will be appreciated that a processor may not specifically refer to a central processing unit (CPU) or graphical processing unit (GPU) but instead to a hardware unit operative to perform the processing of managing and performing the display of frames on a screen of a display device. It will be appreciated that this processor may be a different or the same processor as used for the link component 1410.

In some embodiments, the display component 1420 may comprise software logic in a software module internal or external to the display controller. When a display component 1420 comprises software logic, it may be said to be on a processor to indicate that the software logic is performed by a processor as part of a display device, the processor operative to manage and perform the display of frames on a screen of a display device. It will be appreciated that, as before, a processor may not specifically refer to a central processing unit (CPU) or graphical processing unit (GPU) but instead to a hardware unit operative to perform the processing of managing and performing the display of frames on a screen of a display device. As before, it will be appreciated that this processor may be a different or the same processor as used for the link component 1410.

In various embodiments, the display component 1420 may be operative to display the data frames in succession at a second rate corresponding to a native refresh rate of the display component 1420. A native refresh rate of a display component 1420 may correspond to a rate at which the display may be updated with new information. For instance, a liquid crystal display (LCD) monitor may have a native refresh rate of 60 Hz. This native refresh rate may correspond to a refresh rate designed into the display and set during manufacture. In some embodiments, a display component 1420 may have only a single native refresh rate and in some embodiments a display component may have a plurality of native refresh rates.

In many instances, the second rate may be greater than the first rate, such as a film being displayed at a native frame rate of 24 fps on a display device 110 running at a native refresh rate of 60 Hz. In these instances, therefore, data frames will be received by the link component 1410 at a rate slower than frames are displayed by the display component 1420.

Figure 15:
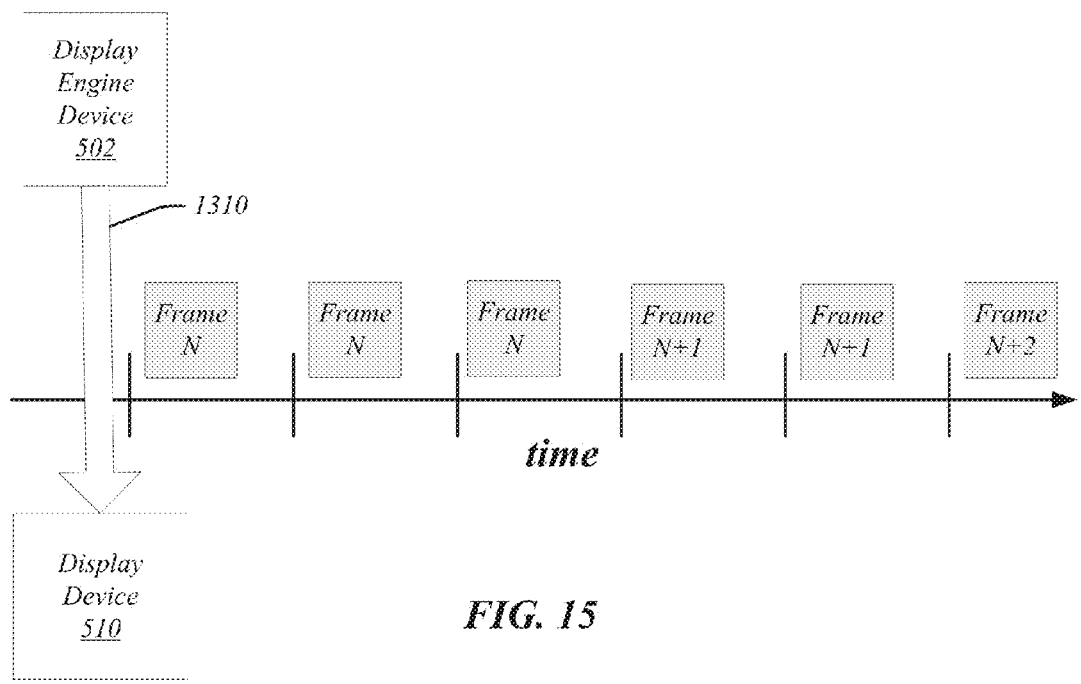
FIG. 15 depicts operation according to a traditional scheme.

Of particular importance is the technique used by the display device 110 to be able to perceive and adapt to this first rate, particularly where data frames being received at the first rate involves varying from the traditional mechanism by which data frames are received over the display interconnect 1310. In this context, the "traditional mechanism" refers to an embodiment in which the rate at which data frames are received is the same as the rate at which data frames are displayed. In some cases, this may be because the first rate, the native frame rate of media content, is equal to the second rate, the native refresh rate of the display component. However, more typically, if these two rates do not match then duplicate data frames will be received over the display interconnect 1310. Which is to say, more typically, under traditional systems, the link component 1410 will periodically receive data frames in succession at a rate corresponding to a native refresh rate of the display component 1420 whether or not that rate corresponds to a native frame rate of the media content. As can be seen in FIG. 15, where the native refresh rate is greater than the native frame rate, this will involve the transmission, over display interconnect 1310, of duplicate copies of the various data frames from display engine device 502 to the display device 510.

As discussed above, however, power savings may be realized for the entity transmitting the data frames if such frames are transmitted (and therefore received) at a first rate corresponding to a native frame rate of media content. Similarly power savings may be realized for the receiving display device 110 if such frames are received (and therefore were transmitted) at the first rate corresponding to a native frame rate of media content as the display device 110 may go into a power-saving mode when new data frames are not being received.

In various embodiments, techniques may be implemented where the display device 110 is able to perceive and adapt to this first rate, wherein data frames are received at a rate which is not a native refresh rate of the display component 1420. In those cases where the initiation of transmission in which the first and second rates do not match, embodiments are capable of maintaining synchronization despite the first and second rates not matching. Further complicating the issue will be the consequences of further power savings which may be realized by depowering the display interconnect 1310 during those intervals in which new data frames are not being received (e.g., during those intervals in which duplicate frames would have been received under a traditional mechanism).

In some embodiments, the initiation of this mismatch between the rate of reception and the rate of display may be initiated by a control signal received over the display interconnect 1310. The link component 1410 may be operative to receive a low-power video control signal over the display interconnect 1310 indicating the commencement of low-power video transfer, the display component 1420 operative to begin the re-display of data frames already shown in response to the reception of the low-power video control signal. A data frame having already been shown may correspond to the display component 1420, such as the LCD panel of an LCD monitor, having displayed the data frame. The low-power video control signal may comprise any of the known methods for transmitting a control signal over a display interconnect 1310, wherein the control signal itself may not be low-power itself but instead may signify that the frames received over the display interconnect 1310 will begin to operate according to the low-power schemes discussed herein. Multiple embodiments of low-power video transfer will be discussed and it should be understood that any of these embodiments may be initiated using a low-power video control signal. In some embodiments, a distinct low-power video control signal may be used for each of the embodiments, such that a single device may be able to perform multiple methods of transmitting or receiving low-power video transfer. Even where a single device is only able to perform one method, or less than all methods, of low-power video transfer, distinct low-power video control signals may be used so as to allow for other devices which support multiple or different methods. In some embodiments, a display device 110 may be operative to transmit to the display engine 106 over the display interconnect 1310 information regarding its ability to support low-power video transfer, such as in response to a request from the display engine 106 for the display device 110 to communicate its capabilities.

It will be appreciated that the display component 1420 being operative to display the data frames in succession at the second rate while the data frames are received at the first rate is an active process in which the display device 110 translates from one rate to another. For instance, if the second rate is greater than the first rate then the display device 110 engages in active efforts to maintain the second rate even though new data frames are only being received at the first rate. In one embodiment, the display component 1420 may be operative to re-display data frames already shown to maintain the second rate. In particular, the display component 1420 may be operative to re-display data frames already shown to maintain the second rate when new data frames have not been received over the display interconnect 1310.

Figure 16:
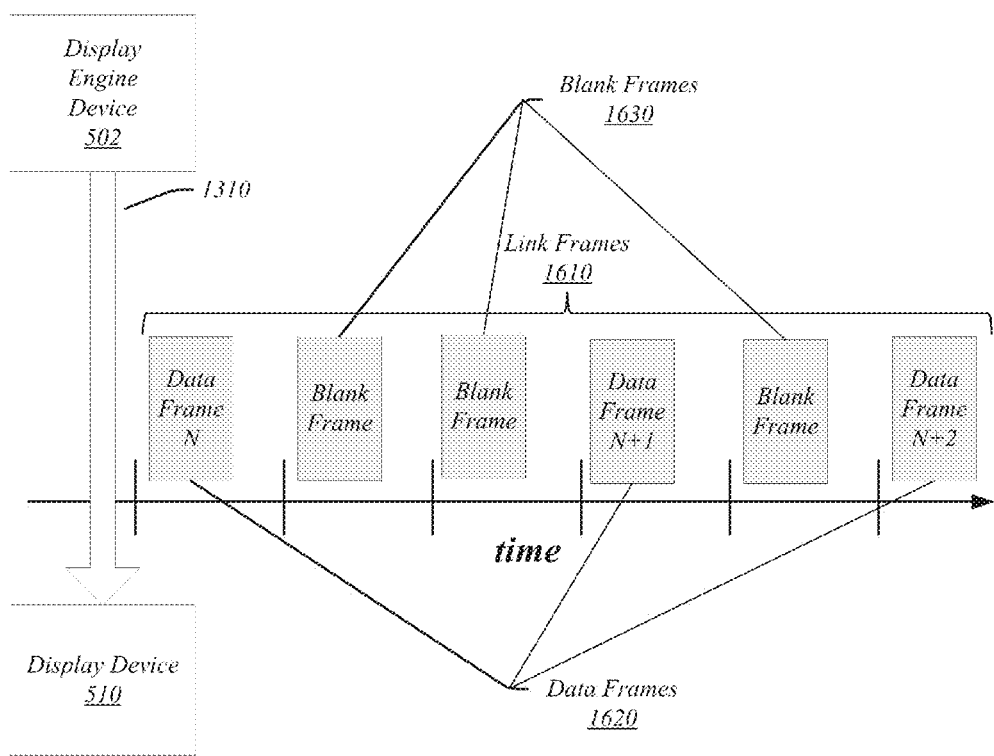
FIG. 16 depicts operation according to an embodiment.

FIG. 16 depicts operation in which the link component 1410 is operative to receive link frames 1610 at the second rate, the link frames 1610 comprising the data frames 1620 and blank frames 1630, the blank frames 1630 received at intervals in the second rate for which the first rate does not provide data frames 1620, the display component 1420 operative to discard the blank frames 1630 in the display of the data frames. A blank frame may correspond to any frame not containing meaningful content, such as image data, for example. In particular, a blank frame may correspond to a data frame in a sequence of data frames 1620 which despite appearing as part of a sequence of frames in the communication of media content does not contain data from that media content. In practice, a blank frame may be transmitted as a frame composed entirely of black video data. A blank frame may generally be thought of as a frame transmitted with the intent that it be discarded rather than displayed, and which upon reception is discarded rather than displayed.

In some embodiments, the timing controller 404 may be operative to maintain synchronization with the display interconnect 1310 based on the received data frames 1620 and blank frames 1630. Such synchronization may use a number of known techniques for maintaining synchronization in a constant stream of link frames 1610, such as a display device 110 would use during normal operation without blank frames 1630.

In both traditional and the embodied systems, synchronization is maintained between the display engine 106 transmitting frames and the link component 1410 receiving frames. A link component 1410 which loses synchronization may fail to correctly identify the beginning of a new data frame and may therefore lose or misinterpret received data, may thereby transmit incorrect information to the display component 1420, and may therefore result in the display device 110 incorrectly displaying media content. However, in traditional embodiments in addition to display data, each frame is received with timing information allowing for the maintenance of synchronization. While a blank frame does not contain data for display it may still be transmitted with the timing information to allow such maintenance. In some embodiments, this timing information may be sent along a separate channel, such as a parallel auxiliary channel. In some embodiment, a parallel auxiliary channel may comprise a separate physical wire connecting the display engine 106 to the display device 110.

Figure 17:
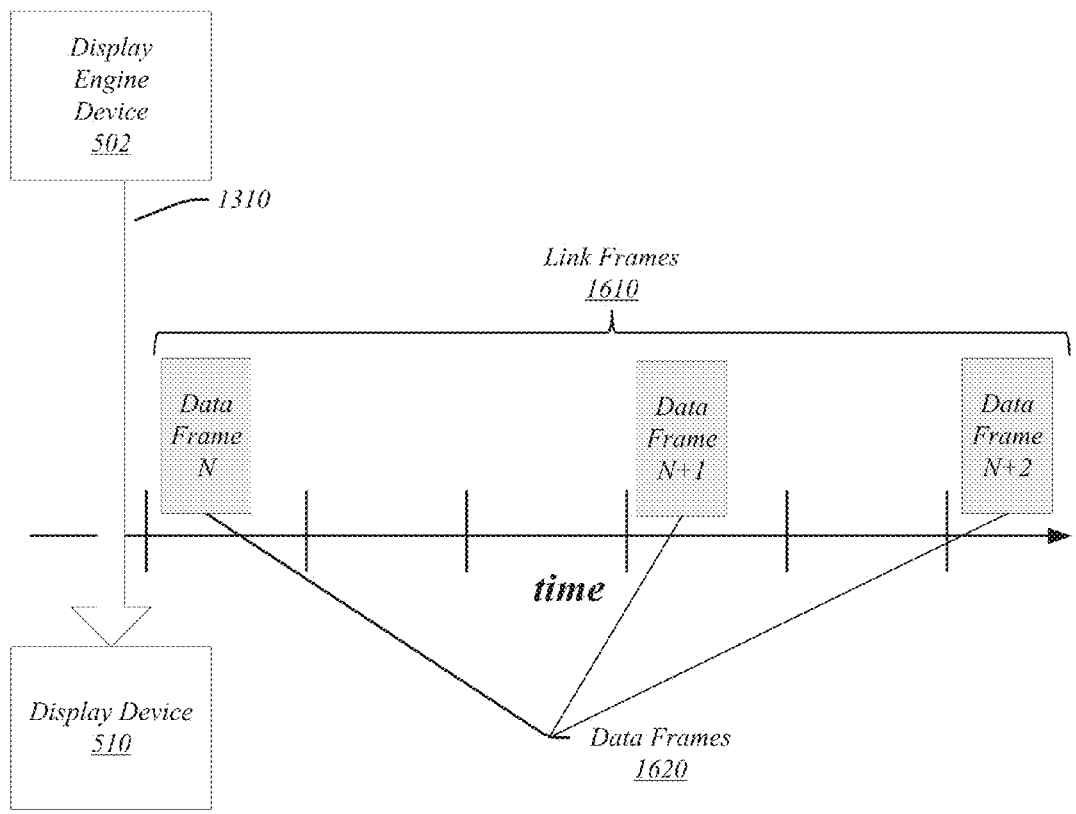
FIG. 17 depicts operation according to another embodiment.

FIG. 17 illustrates an embodiment in which the link component 1410 may be operative to receive link frames 1610 at the first rate, wherein the data frames 1620 are received within intervals corresponding to the second rate. As can be seen in the illustrated embodiment, the interval used to transmit an individual data frame is the same as in the embodiment of FIG. 16, which runs at the second rate, the native refresh rate of the display component 1420. However, data frames 1610 are only received when a new data frame is to be displayed, such that the actual reception of link frames 1610 occurs at the first rate, the native frame rate of the media content.

Figure 18:
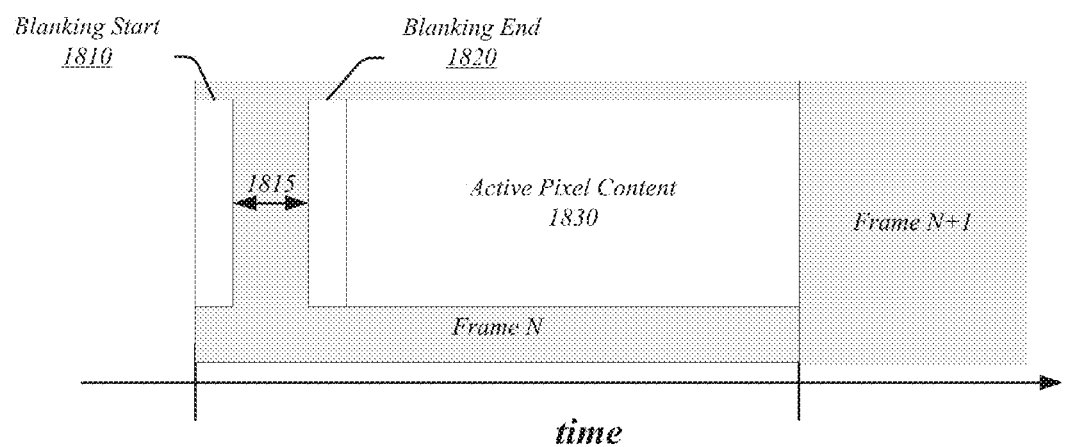
FIG. 18 illustrates an expanded view of a frame.

FIG. 18 illustrates an expanded view of a frame. As can be seen in the embodiment of FIG. 18, the transmission of a frame may comprise a blanking start 1810, then a delay 1815, then a blanking end 1820, and then the active pixel content 1830. The blanking start 1810 corresponds to a control signal sent across the display interconnect 1310 to indicate the start of a blanking period. The blanking end 1820 corresponds to a control signal sent across the display interconnect 1310 to indicate the end of a blanking period. For some display devices, such as a cathode-ray tube (CRT) display, the blanking period may allow the magnetic coils which guide the electron beam that produces the viewed image time to adjust. For other display devices, such as a liquid-crystal display (LCD), the blanking period may be a legacy feature included to allow the display interconnect 1310 to accommodate displays that require the blanking period and displays that do not require it. The active pixel content 1830 corresponds to the data payload of a frame containing the media content for display. As previously discussed, in some embodiments the active pixel content for 1830 may be blank, or merely a black frame, when a blank frame is being transmitted. In some cases, the term "vertical blanking interval" may be used synonymously with the term "blanking period."

As illustrated in the embodiment of FIG. 18 the display interconnect 1310 is always in one of four states: transmitting a blanking start 1810, waiting through delay 1815 for the end of the blanking period, transmitting a blanking end 1820, or transmitting active pixel content 1830. Immediately following the end of transmitting active pixel content 1830 a new blanking start would be transmitted for the new frame.

Because each blanking end 1820 immediately precedes active pixel content 1830, a blank end 1820 may be used to synchronize a timing controller 404 to the transmitted content. This allows for the display interconnect 1310 to only be powered during the intervals corresponding to the second rate in which the data frames 1620 are being received: while data frames 1620 are not being received, the display interconnect 1310 could also be a fifth state, unpowered. As can be seen in FIG. 17, if the native refresh rate of the display component 1420 exceeds the native frame rate of the media content, extents of time will exist in which no data frame is being broadcast. In one embodiment, as discussed with reference to FIG. 16, blank frames 1630 may be transmitted during these extents of time. Alternatively, as illustrated in FIG. 17, nothing may be broadcast during these extends of time. If nothing is transmitted during these extents, then the display interconnect 1310 may be de-powered during them, leading to a reduction in power used by the system.

However, synchronization between the timing controller 404 and the signals received over display interconnect 1310 may be lost due to drift. During traditional operation, the constant reception of link frames 1610 would allow for correction of this drift. As previously discussed, as long as the display interconnect 1310 is powered, even if no data for display is being transmitted, timing information may still be received over the display interconnect 1310. However, with the de-powered gaps, this may not be possible. Instead, the timing controller 404 may be operative to maintain synchronization with the display interconnect 1310 based on a timing of a blanking period received over the display interconnect 1310. This may specifically entail the display component 1420 inserting or removing lines of blanking until a blanking end 1820 signal is received by the link component 1410 over the display interconnect 1310.

Under traditional operation, the blanking period may be of a set length, such as 10 milliseconds. Under the illustrated embodiment, the blanking period may be of a variable length. This length may be determined by the timing controller 404 initiating the blanking period according to its own internal clock, but ending the blanking period according to the reception of a blanking end 1820 signal. As many displays such as LCDs do not require the blanking period for their operation— they have no magnetic coils to realign—this does not interfere with the operation of the display while serving to maintain the synchronization.

FIG. 19 depicts an exemplary logic flow 1900. At block 1902 data frames are received over a display interconnect, the data frames received periodically in succession at a first rate corresponding to a native frame rate of media content being received via the data frames over the display interconnect.

In some embodiments, the data frames may be a subset of link frames received over the display interconnect. The link frames may be received at the second rate, the link frames comprising the data frames and blank frames, the blank frames received at intervals in the second rate for which the first rate does not provide data frames. In these cases, the blank frames may be discarded in the display of the data frames. Discarding the blank frames may correspond to selecting the data frames from the link frames and selectively displaying the data frames while not displaying the blank frames. In some embodiments, synchronization may be maintained with the display interconnect based on the received data frames and blank frames.

In other embodiments, the link frames may be received at the first rate and may be entirely composed of data frames, with no blank frames received. During the reception of link frames at the first rate, the data frames may be received within intervals corresponding to the second rate. In these embodiments, the display interconnect may only be powered during the intervals corresponding to the second rate in which the data frames are being received. Synchronization may be maintained with the display interconnect based on a timing of a blanking period received over the display interconnect. This maintenance of synchronization may comprise inserting or removing lines of blanking until a blanking end signal is received over the display interconnect.

At block 1904, the data frames are displayed in succession at a second rate corresponding to a native refresh rate of a display component.

At block 1906, data frames already shown are re-displayed to maintain the second rate when new data frames have not been received over the display interconnect. In some embodiments, a low-power video control signal may be received over the display interconnect indicating the commencement of low-power video transfer. The re-display of the data frames already shown may be begun in response to the reception of the low-power video control signal.

Exemplary Computing Architecture

Figure 20:
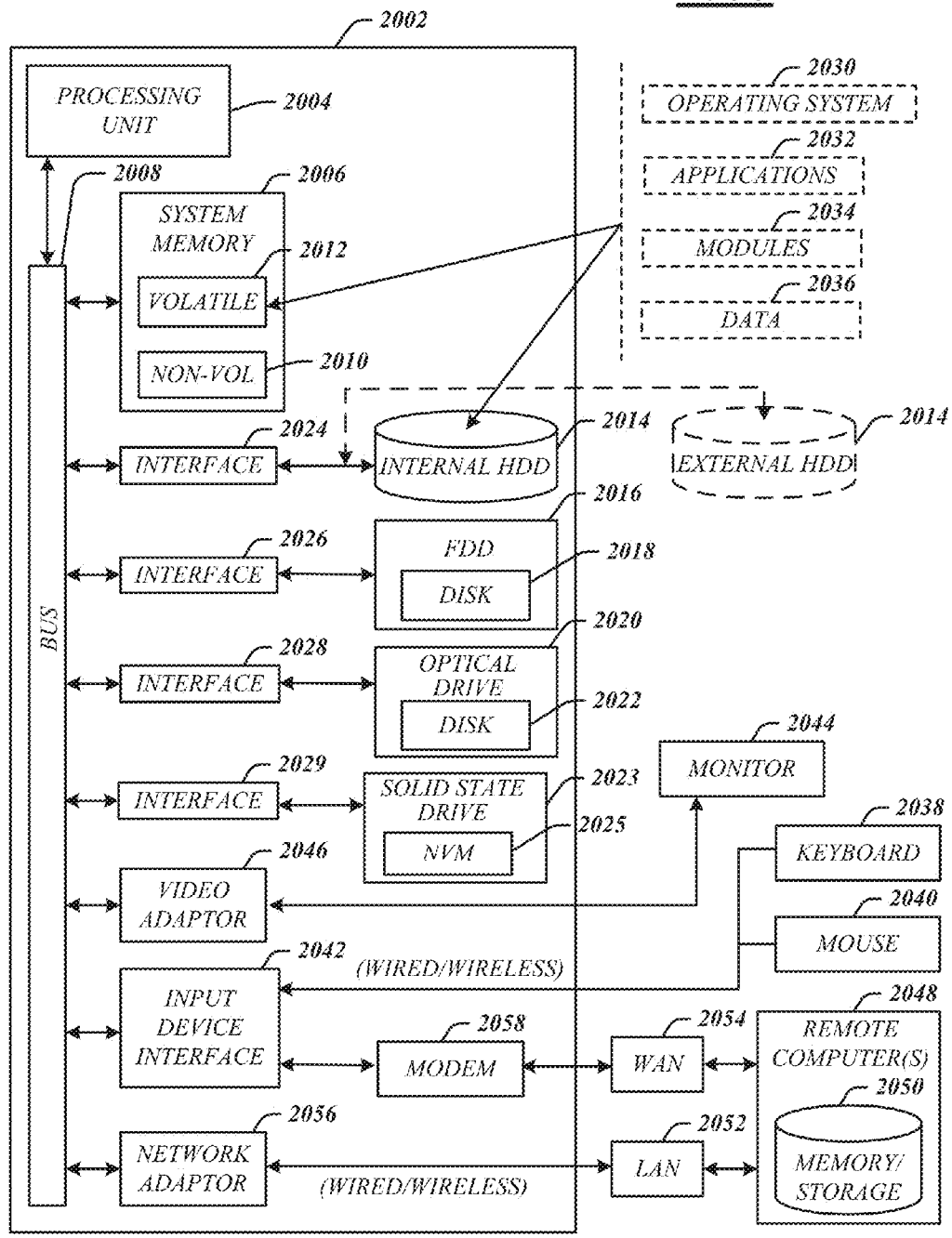
FIG. 20 is a diagram of an exemplary system embodiment.

FIG. 20 illustrates an embodiment of an exemplary computing architecture 2000 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 2000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 2000 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 2000 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 2000.

As shown in FIG. 20, the computing architecture 2000 comprises a processing unit 2004, a system memory 2006 and a system bus 2008. The processing unit 2004 can be any of various commercially available processors. Dual microprocessors and other multi-processor architectures may also be employed as the processing unit 2004. The system bus 2008 provides an interface for system components including, but not limited to, the system memory 2006 to the processing unit 2004. The system bus 2008 can be any of several types of bus structure that may further interconnect to a memory bus (with or without a memory controller), a peripheral bus, and a local bus using any of a variety of commercially available bus architectures.

The computing architecture 2000 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 2006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 20, the system memory 2006 can include non-volatile memory 2010 and/or volatile memory 2012. A basic input/output system (BIOS) can be stored in the non-volatile memory 2010.

The computer 2002 may include various types of computer-readable storage media in the form of one or more lower speed memory units, including an internal hard disk drive (HDD) 2014, a magnetic floppy disk drive (FDD) 2016 to read from or write to a removable magnetic disk 2018, and an optical disk drive 2020 to read from or write to a removable optical disk 2022 (e.g., a CD-ROM or DVD); and a solid state drive (SSD) 2023 to read or write data to/from a non-volatile memory (NVM) 2025, including a NAND flash memory, phase change memory (PCM), a spin memory; phase change memory with switch (PCMS), magnetoresistive random access memory (MRAM), spin memory, nanowire memory, ferroelectric transistor random access memory (FeTRAM). The HDD 2014, FDD 2016, optical disk drive 2020, and solid state drive 2023 can be connected to the system bus 2008 by a HDD interface 2024, an FDD interface 2026, an optical drive interface 2028, and a solid state drive interface 2029, respectively. The HDD interface 2024 for external drive implementations can include at least one or both of Universal Serial Bus (USB) and IEEE 2094 interface technologies. The solid state drive interface 2029 may comprise any suitable interface for coupling to the host device, such as, for example, but not limited to, a serial advanced technology attachment (SATA) interface, a serial attached SCSI (SAS) interface, a universal serial bus (USB) interface, a peripheral control interface (PCI), or other suitable device interface.

The drives and associated computer-readable media provide volatile and/or nonvolatile storage of data, data structures, computer-executable instructions, and so forth. For example, a number of program modules can be stored in the drives and memory units 2010, 2012, including an operating system 2030, one or more application programs 2032, other program modules 2034, and program data 2036.

A user can enter commands and information into the computer 2002 through one or more wire/wireless input devices, for example, a keyboard 2038 and a pointing device, such as a mouse 2040. Other input devices may include a microphone, an infra-red (IR) remote control, a joystick, a game pad, a stylus pen, touch screen, or the like. These and other input devices are often connected to the processing unit 2004 through an input device interface 2042 that is coupled to the system bus 2008, but can be connected by other interfaces such as a parallel port, IEEE 2094 serial port, a game port, a USB port, an IR interface, and so forth.

A monitor 2044 or other type of display device is also connected to the system bus 2008 via an interface, such as a video adaptor 2046. In addition to the monitor 2044, a computer typically includes other peripheral output devices, such as speakers, printers, and so forth.

The computer 2002 may operate in a networked environment using logical connections via wire and/or wireless communications to one or more remote computers, such as a remote computer 2048. The remote computer 2048 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2050 is illustrated. The logical connections depicted include wire/wireless connectivity to a local area network (LAN) 2052 and/or larger networks, for example, a wide area network (WAN) 2054. Such LAN and WAN networking environments are commonplace in offices and companies, and facilitate enterprise-wide computer networks, such as intranets, all of which may connect to a global communications network, for example, the Internet.

When used in a LAN networking environment, the computer 2002 is connected to the LAN 2052 through a wire and/or wireless communication network interface or adaptor 2056. The adaptor 2056 can facilitate wire and/or wireless communications to the LAN 2052, which may also include a wireless access point disposed thereon for communicating with the wireless functionality of the adaptor 2056.

When used in a WAN networking environment, the computer 2002 can include a modem 2058, or is connected to a communications server on the WAN 2054, or has other means for establishing communications over the WAN 2054, such as by way of the Internet. The modem 2058, which can be internal or external and a wire and/or wireless device, connects to the system bus 2008 via the input device interface 2042. In a networked environment, program modules depicted relative to the computer 2002, or portions thereof, can be stored in the remote memory/storage device 2050. It will be appreciated that the network connections shown are exemplary and other means of establishing a communications link between the computers can be used.

The computer 2002 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In one embodiment, an apparatus may include a memory and graphics logic operative to render a set of one or more data frames for storage in the memory using a received set of data of a digital medium, and output one or more control signals at a first interval. The apparatus may also include a display engine operative to receive the one or more control signals from the graphics logic, retrieve the set of one or more data frames from the memory, and send the one or more data frames to a display device for visual presentation. The one or more data frames may be sent periodically in succession at a second interval corresponding to a native frame rate of the digital medium.

In another embodiment, the graphics logic may be operative to send a signal to one or more devices to enter a lower power mode between sending a first control signal to the display engine to retrieve a first set of one or more data frames and sending a next control signal to the display engine to retrieve a next set of one or more data frames, the lower power mode to span a period of time equal to the first interval.

Alternatively, or in addition, in another embodiment the second interval may be less than the first interval.

Alternatively, or in addition, in a further embodiment the one or more devices including a central processing unit (CPU), a graphics processing unit (GPU) and voltage regulator.

Alternatively, or in addition, in a further embodiment the data frames may comprise compressed data.

Alternatively, or in addition, in a further embodiment the second interval may comprise $1/24$ second.

Alternatively, or in addition, in a further embodiment the graphics logic may be operative to look ahead in a command queue to process a multiplicity of frames to be forwarded for transmission by the display engine, to render the multiplicity frames as a multiplicity of data frames in an instance, and to store the multiplicity of data frames to system memory.

Alternatively, or in addition, in a further embodiment, the set of control signals may comprise a frame buffer flip notification in which designation of the first memory is switched from a back buffer to a front buffer to be read by the display engine.

Alternatively, or in addition, in a further embodiment the display engine may be operative to enter a lower power mode between transmission of a current data frame and transmission of a next data frame.

Alternatively, or in addition, in a further embodiment the apparatus may comprise a digital display operative to present the data frames as a video presentation, the digital display having a refresh rate corresponding to a third interval that is less than the second interval or less than the first interval.

Alternatively, or in addition, in a further embodiment each data frame of the one or more data frames may be sent in a single instance.

In another embodiment, a computer implemented method may include rendering a set of one or more data frames for storage in a first memory using a received set of data of a digital medium. The computer implemented method may further include outputting one or more control signals at a first interval, retrieving the set of one or more data frames from the first memory, and sending the one or more data frames sent periodically in succession at a second interval corresponding to a native frame rate of the digital medium.

In another embodiment, the computer implemented method may include sending a signal to one or more devices to enter a lower power mode during a period between sending a first control signal to the display engine to retrieve a first set of one or more data frames and sending a next control signal to the display engine to retrieve a next set of one or more data frames, the lower power mode to span a period of time equal to the first interval.

Alternatively, or in addition, in a further embodiment the computer implemented method may include sending a signal to one or more of a central processing unit (CPU), a graphics processing unit (GPU) and voltage regulator to enter a lower power mode during the period.

Alternatively, or in addition, in a further embodiment the second period may equal $1/24$ second.

Alternatively, or in addition, in a further embodiment the method may include rendering a multiplicity of data frames comprising the first set of data frames at a first instance, and rendering a second multiplicity of data frames comprising the next set of data frames at a second instance, where the first and second instance are separated in time by the first interval.

Alternatively, or in addition, in a further embodiment the computer implemented method may include setting a timer for the lower power mode to span a third interval equal to at least two times the second interval.

Alternatively, or in addition, in another embodiment, the computer implemented method may comprise sending each data frame of the one or more data frames at a single instance, where the second interval is less than the first interval.

In another embodiment, an apparatus may comprise a memory and graphics logic, the graphics logic to render a set of one or more data frames for storage in a memory using a received set of data of a digital medium output one or more control signals at a first interval, the control signals operative to direct transmission of the one or more data frames periodically in succession at a second interval corresponding to a native frame rate of the digital medium.

In another embodiment the graphics logic may be operative to send a signal to one or more devices to enter a lower power mode between sending a first control signal to the display engine to retrieve a first set of one or more data frames and sending a next control signal to the display engine to retrieve a next set of one or more data frames, the lower power mode to span a period of time equal to the first interval.

Alternatively, or in addition, in a further embodiment, the second interval may be less than or equal to the first interval.

Alternatively, or in addition, in a further embodiment, the graphics logic may be operative to look ahead in a command queue to process a multiplicity of frames to be forwarded for transmission, render the multiplicity frames as a multiplicity of data frames in an instance, and store the multiplicity of data frames to the memory.

In one embodiment, an apparatus may comprise: a link component operative to receive media content via data frames over a display interconnect, the data frames received periodically in succession at a first rate corresponding to a native frame rate of media content; and a display component operative to display the data frames in succession at a second rate corresponding to a native refresh rate of the display component, the display component operative to re-display data frames already shown to maintain the second rate when new data frames have not been received over the display interconnect.

Alternatively or additionally, the link component may be operative to receive a low-power video control signal over the display interconnect indicating the commencement of low-power video transfer, the display component operative to begin the re-display of data frames already shown in response to the reception of the low-power video control signal.

Alternatively or additionally, the link component may be operative to receive a request to confirm a capability for low-power video transfer and to transmit a response indicating the capability for low-power video transfer.

Alternatively or additionally, the link component may be operative to receive link frames at the second rate, the link frames comprising the data frames and blank frames, the blank frames received at intervals in the second rate for which the first rate does not provide data frames, the display component operative to discard the blank frames in the display of the data frames.

Alternatively or additionally, a timing controller component may be operative to maintain synchronization with the display interconnect based on the received data frames and blank frames.

Alternatively or additionally, the link component may be operative to receive link frames at the first rate, wherein the data frames are received within intervals corresponding to the second rate.

Alternatively or additionally, the display interconnect may only be powered during the intervals corresponding to the second rate in which the data frames are being received.

Alternatively or additionally, a timing controller may be operative to maintain synchronization with the display interconnect based on a timing of a blanking period received over the display interconnect.

Alternatively or additionally, maintaining synchronization with the display interconnect based on a timing of the blanking period received over the display interconnect may comprise the display component inserting or removing lines of blanking until a blanking end signal is received by the link component over the display interconnect.

Alternatively or additionally, the timing controller may be operative to initiate maintaining synchronization based on the timing of the blanking period in response to receiving a low-power video control signal over the display interconnect.

In another embodiment, a computer-implemented method may comprise: receiving media content via data frames over a display interconnect, the data frames received periodically in succession at a first rate corresponding to a native frame rate of the media content; displaying the data frames in succession at a second rate corresponding to a native refresh rate of a display component; and re-displaying data frames already shown to maintain the second rate when new data frames have not been received over the display interconnect.

Alternatively or additionally, the method may comprise receiving a low-power video control signal over the display interconnect indicating the commencement of low-power video transfer; and beginning the re-display of the data frames already shown in response to the reception of the low-power video control signal.

Alternatively or additionally, the method may comprise receiving link frames at the second rate, the link frames comprising the data frames and blank frames, the blank frames received at intervals in the second rate for which the first rate does not provide data frames; and discarding the blank frames in the display of the data frames.

Alternatively or additionally, the method may comprise maintaining synchronization with the display interconnect based on the received data frames and blank frames.

Alternatively or additionally, the method may comprise receiving link frames at the first rate, wherein the data frames are received within intervals corresponding to the second rate; and powering the display interconnect only during the intervals corresponding to the second rate in which the data frames are being received.

Alternatively or additionally, the method may comprise maintaining synchronization with the display interconnect based on a timing of a blanking period received over the display interconnect.

Alternatively or additionally, maintaining synchronization with the display interconnect based on a timing of the blanking period received over the display interconnect may comprise inserting or removing lines of blanking until a blanking end signal is received over the display interconnect.

Another embodiment may comprise at least one computer-readable storage medium comprising a plurality of instructions that in response to being executed on a computing device cause the computing device to carry out a method according to any one of claims 11 to 15.

Another embodiment may comprise an apparatus comprising means for performing the method of any of claims 11 to 15.

Another embodiment may comprise a digital display device arranged to perform the method of any of claims 11 to 15.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a processor;
   a link component operative to:
   receive media content via data frames over a display interconnect, the data frames received periodically in succession at a first rate corresponding to a native frame rate of the media content, and
   receive a request to confirm a capability for low-power video transfer and to transmit a response indicating the capability for low-power video transfer; and
   a display component operative on the processor to display the data frames in succession at a second rate corresponding to a native refresh rate of the display component, re-display data frames already shown to maintain the second rate when new data frames have not been received over the display interconnect.

2. The apparatus of claim 1, the link component operative to receive a low-power video control signal over the display interconnect to indicate the commencement of low-power video transfer, the display component operative to begin the re-display of data frames already shown in response to the reception of the low-power video control signal.

3. The apparatus of claim 1, the link component operative to receive link frames at the second rate, the link frames comprising the data frames and blank frames, the blank frames received at intervals in the second rate for which the first rate does not provide data frames, the display component operative to discard the blank frames in the display of the data frames.

4. The apparatus of claim 3, comprising:
   a timing controller component operative to maintain synchronization with the display interconnect based on the received data frames and blank frames.

5. The apparatus of claim 1, the link component operative to receive link frames at the first rate, wherein the data frames are received within intervals corresponding to the second rate.

6. The apparatus of claim 5, the display interconnect only powered during the intervals corresponding to the second rate in which the data frames are being received.

7. The apparatus of claim 6, comprising:
   a timing controller operative to maintain synchronization with the display interconnect based on a timing of a blanking period received over the display interconnect.

8. The apparatus of claim 7, wherein maintaining synchronization with the display interconnect based on a timing of the blanking period received over the display interconnect comprises the display component to insert or remove lines of blanking until a blanking end signal is received by the link component over the display interconnect.

9. The apparatus of claims 7, comprising a display to present the data frames.

10. A computer-implemented method, comprising:
    receiving a request to confirm a capability for low-power video transfer;
    transmitting a response indicating the capability for low-power video transfer;
    receiving media content via data frames over a display interconnect, the data frames received periodically in succession at a first rate corresponding to a native frame rate of the media content;
    displaying the data frames in succession at a second rate corresponding to a native refresh rate of a display component; and
    re-displaying data frames already shown to maintain the second rate when new data frames have not been received over the display interconnect.

11. The computer-implemented method of claim 10, comprising:
    receiving a low-power video control signal over the display interconnect indicating the commencement of low-power video transfer; and beginning the re-display of the data frames already shown in response to the reception of the low-power video control signal.

12. The computer-implemented method of claim 10, comprising:
receiving link frames at the second rate, the link frames comprising the data frames and blank frames, the blank frames received at intervals in the second rate for which the first rate does not provide data frames; and
discarding the blank frames in the display of the data frames.

13. The computer-implemented method of claim 12, comprising:
maintaining synchronization with the display interconnect based on the received data frames and blank frames.

14. The computer-implemented method of claim 10, comprising:
receiving link frames at the first rate, wherein the data frames are received within intervals corresponding to the second rate; and
powering the display interconnect only during the intervals corresponding to the second rate in which the data frames are being received.

15. The computer-implemented method of claim 14, comprising:
maintaining synchronization with the display interconnect based on a timing of a blanking period received over the display interconnect.

16. The computer-implemented method of claim 15, wherein maintaining synchronization with the display interconnect based on a timing of the blanking period received over the display interconnect comprises:
inserting or removing lines of blanking until a blanking end signal is received over the display interconnect.

17. At least one non-transitory computer-readable storage medium comprising a plurality of instructions that in response to being executed on a computing device cause the computing device to:
receive a request to confirm a capability for low-power video transfer;
transmit a response indicating the capability for low-power video transfer;
receive media content via data frames over a display interconnect, the data frames received periodically in succession at a first rate corresponding to a native frame rate of the media content;
display the data frames in succession at a second rate corresponding to a native refresh rate of a display component; and
re-display data frames already shown to maintain the second rate when new data frames have not been received over the display interconnect.

18. The at least one non-transitory computer-readable storage medium of claim 17, further comprising a plurality of instructions that in response to being executed on a computing device cause the computing device to:
receive a low-power video control signal over the display interconnect indicating the commencement of low-power video transfer; and
begin the re-display of the data frames already shown in response to the reception of the low-power video control signal.

19. The at least one non-transitory computer-readable storage medium of claim 17, further comprising a plurality of instructions that in response to being executed on a computing device cause the computing device to:
receive link frames at the second rate, the link frames comprising the data frames and blank frames, the blank frames received at intervals in the second rate for which the first rate does not provide data frames; and
discard the blank frames in the display of the data frames.

20. The at least one non-transitory computer-readable storage medium of claim 19, further comprising a plurality of instructions that in response to being executed on a computing device cause the computing device to:
maintain synchronization with the display interconnect based on the received data frames and blank frames.

21. The at least one non-transitory computer-readable storage medium of claim 17, further comprising a plurality of instructions that in response to being executed on a computing device cause the computing device to:
receive link frames at the first rate, wherein the data frames are received within intervals corresponding to the second rate; and
power the display interconnect only during the intervals corresponding to the second rate in which the data frames are being received.

22. The at least one non-transitory computer-readable storage medium of claim 21, further comprising a plurality of instructions that in response to being executed on a computing device cause the computing device to:
maintain synchronization with the display interconnect based on a timing of a blanking period received over the display interconnect.

23. The at least one non-transitory computer-readable storage medium of claim 22, wherein maintaining synchronization with the display interconnect based on a timing of the blanking period received over the display interconnect comprises a plurality of instructions that in response to being executed on a computing device cause the computing device to:
insert or remove lines of blanking until a blanking end signal is received over the display interconnect.

24. An apparatus comprising means for:
receiving a request to confirm a capability for low-power video transfer;
transmitting a response indicating the capability for low-power video transfer
receiving media content via data frames over a display interconnect, the data frames received periodically in succession at a first rate corresponding to a native frame rate of the media content;
displaying the data frames in succession at a second rate corresponding to a native refresh rate of a display component; and
re-displaying data frames already shown to maintain the second rate when new data frames have not been received over the display interconnect.

25. The apparatus of claim 24, comprising means for:
receiving a low-power video control signal over the display interconnect indicating the commencement of low-power video transfer; and
beginning the re-display of the data frames already shown in response to the reception of the low-power video control signal.

26. The apparatus of claim 24, comprising means for:
receiving link frames at the second rate, the link frames comprising the data frames and blank frames, the blank frames received at intervals in the second rate for which the first rate does not provide data frames; and
discarding the blank frames in the display of the data frames.

27. The apparatus of claim 26, comprising means for:
maintaining synchronization with the display interconnect based on the received data frames and blank frames.

28. The apparatus of claim 24, comprising means for:
receiving link frames at the first rate, wherein the data frames are received within intervals corresponding to the second rate; and
powering the display interconnect only during the intervals corresponding to the second rate in which the data frames are being received.

29. The apparatus of claim 28, comprising means for:
maintaining synchronization with the display interconnect based on a timing of a blanking period received over the display interconnect.

30. The apparatus of claim 29, wherein means for maintaining synchronization with the display interconnect based on a timing of the blanking period received over the display interconnect comprises means for:
inserting or removing lines of blanking until a blanking end signal is received over the display interconnect.

31. A digital display device comprising:
a digital display screen;
a component to receive a request to confirm a capability for low-power video transfer:
a component to transmit a response indicating the capability for low-power video transfer;
a component to receive media content via data frames over a display interconnect, the data frames received periodically in succession at a first rate corresponding to a native frame rate of the media content;
a component to display the data frames on the digital display screen in succession at a second rate corresponding to a native refresh rate of a display component; and
a component to re-display on the digital display screen data frames already shown to maintain the second rate when new data frames have not been received over the display interconnect.

32. The digital display device of claim 31, comprising:
a component to receive a low-power video control signal over the display interconnect indicating the commencement of low-power video transfer; and
a component to begin the re-display of the data frames already shown in response to the reception of the low-power video control signal.

33. The digital display device of claim 31, comprising:
a component to receive link frames at the second rate, the link frames comprising the data frames and blank frames, the blank frames received at intervals in the second rate for which the first rate does not provide data frames; and
a component to discard the blank frames in the display of the data frames.

34. The digital display device of claim 33, comprising:
a component to maintain synchronization with the display interconnect based on the received data frames and blank frames.

35. The digital display device of claim 31, comprising:
a component to receive link frames at the first rate, wherein the data frames are received within intervals corresponding to the second rate; and
a component to power the display interconnect only during the intervals corresponding to the second rate in which the data frames are being received.

36. The digital display device of claim 35, comprising:
a component to maintain synchronization with the display interconnect based on a timing of a blanking period received over the display interconnect.

37. The digital display device of claim 36, wherein maintaining synchronization with the display interconnect based on a timing of the blanking period received over the display interconnect comprises:
a component to insert or remove lines of blanking until a blanking end signal is received over the display interconnect.

* * * * *